(12) United States Patent
Hadley et al.

(10) Patent No.: US 7,292,345 B2
(45) Date of Patent: Nov. 6, 2007

(54) FIBRE-OPTIC INTERFEROMETRIC REMOTE SENSOR

(75) Inventors: Maxwell R. Hadley, Lyndhurst (GB); Arthur H. Hartog, Southampton (GB); Yuehua Chen, Reading (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/514,919

(22) PCT Filed: May 13, 2003

(86) PCT No.: PCT/GB03/02055

§ 371 (c)(1),
(2), (4) Date: Nov. 15, 2004

(87) PCT Pub. No.: WO03/098156
PCT Pub. Date: Nov. 27, 2003

(65) Prior Publication Data
US 2005/0232531 A1    Oct. 20, 2005

(30) Foreign Application Priority Data
May 17, 2002  (GB) ................... 0211389.2
May 17, 2002  (GB) ................... 0211390.0

(51) Int. Cl.
*G01B 9/02*    (2006.01)

(52) U.S. Cl. .................................................... 356/479
(58) Field of Classification Search ........ 356/477–479, 356/497; 250/227.19, 227.27
See application file for complete search history.

(56) References Cited

U.S. PATENT DOCUMENTS 6,122,305 A * 9/2000 Putnam et al. ................ 372/94

* cited by examiner

*Primary Examiner*—Patrick Connolly
(74) *Attorney, Agent, or Firm*—Osha Liang LLP; Bryan P. Galloway; Tim Currington

(57) ABSTRACT

A method and apparatus for receiving measurements from an interferometer transducer (22) uses a broad band light beam (19A), reflected from the transducer (22), and compares it with the amplitudes of narrow band beams, derived from the reflected broad band light beam (19A), by filters (23A-23D) on different frequencies. The narrow band light beams and the broad band light beam (19A) are measured on photo detectors (22A, 21B-21E). Microprocessor (57) compares outputs of the photo detectors to interpret phase differences between signals (25, 27, 29) from the narrow band beams. A periodically operable shutter and a single photo detector (21) can also be used. Other embodiments modulate (12) the light source (10) to produce very short broad band pulses of light (36, 40) which are reflected from the transducer (22).

116 Claims, 18 Drawing Sheets

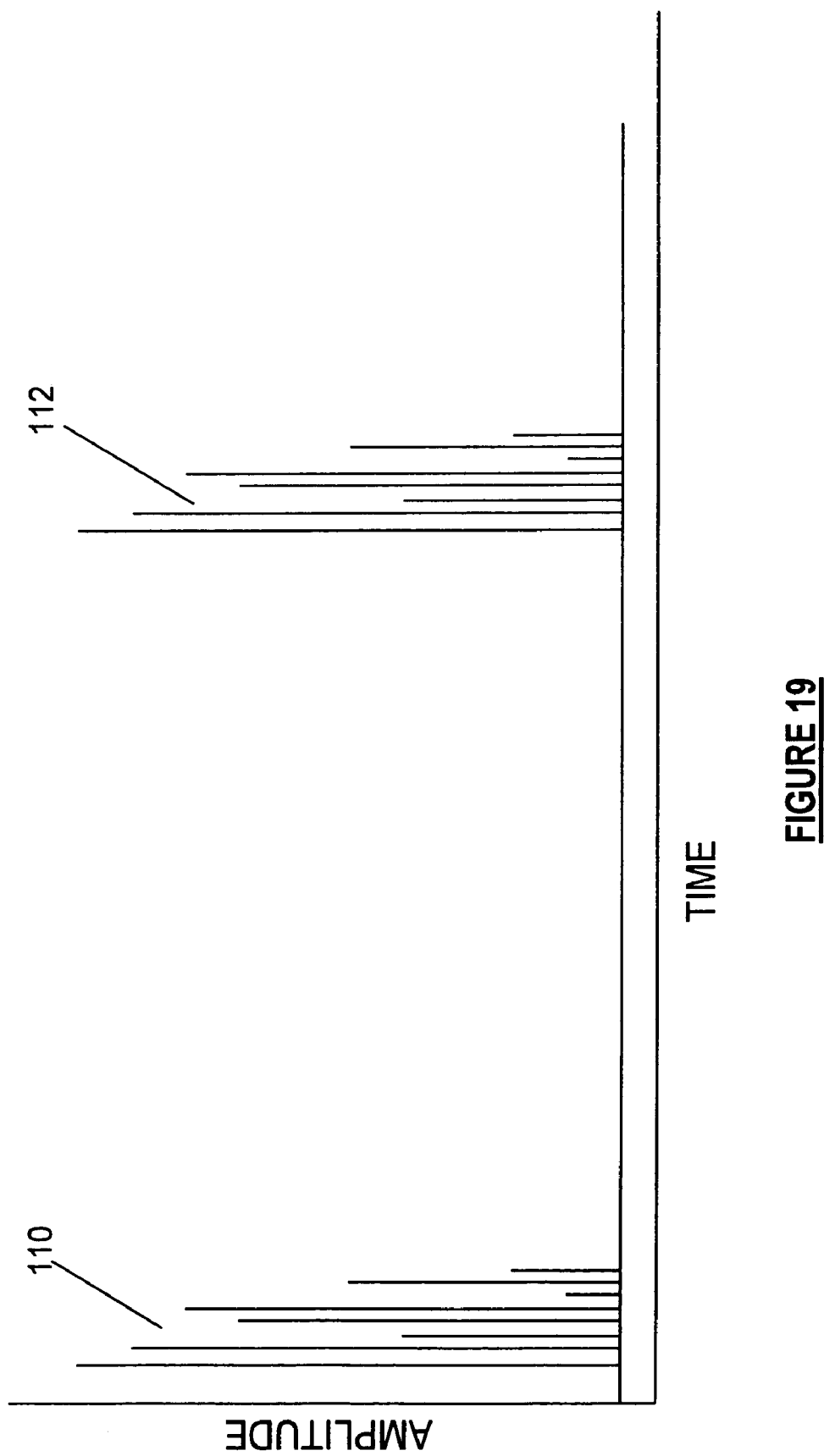

FIBRE-OPTIC INTERFEROMETRIC REMOTE SENSOR

The present invention relates to remote monitoring of a parameter which is encoded by means of the parameter or parameters varying the dimensions of a dual path light cell (interferometer). It particularly relates to temperature, flow rate, chemical property, strain or pressure measurement using light, sent to and returned from an interferometric transducer at the end of a fibre optic line.

The present invention most particularly relates to a method and apparatus where the broadband light is sent, via the fibre optic line, to and from the transducer, the return light being subject to a first intensity measurement in broadband and subjected to a second intensity measurement after it has been subjected to narrow bandwidth filtering, the ratio of the two measurements giving a measure of the interferometer path difference and thus of the measured temperature, strain, flow rate, chemical property, or pressure. The invention concerns improvements to such a measurement system and is applicable to, but not exclusively, for example, pressure, strain or temperature measurements in a hydrocarbon well or like hostile and inaccessible environment.

The prior art includes a first type of signal processing where the path imbalance occasioned by the interferometer is determined by submitting the signal from the sensor to a second (interrogating) interferometer, the path imbalance of which can be adjusted. By sweeping the interrogating interferometer over the range of path imbalances which can be exhibited by the sensor, a cross-correlation between the modulations of the source spectrum applied by the two interferometers is obtained and, from this and detailed knowledge of the position of the interrogating interferometer, the position of the sensing interferometer can be deduced, often with a high degree of resolution and absolute accuracy. Specific implementations include mechanically scanned interferometers. Electronically scanned interferometers have been implemented by splitting the incoming optical signal from the sensor with a wedge and applying the resulting Fizeau fringes to a CCD Charge coupled device array or similar linear image sensor (U.S. Pat. Nos. 5,202, 939 and 5,392,117). There are many variations on these basic principles in the literature.

The benefits of recovering the interferometer position by some form of matched interferometer are that a wide dynamic range can be achieved since in most configurations the transducer can vary the optical path difference by more than one fringe. In addition, the information is spread over the entire spectrum of the source and it follows that the method is robust to variations in the spectral attenuation of the fibre connecting the sensor to the opto-electronic unit (the down lead). However, the stability of the recovery interferometer is then critical to the accuracy of the measurement and ensuring adequate stability against changes in temperature and mechanical drift can result in an expensive readout system. In the case of electronically scanned interrogating interferometers, the range of low-cost, line imaging devices usually restricts operation to wavelengths shorter than 1000 nm. As a result, the fibre losses at the operating wavelength are increased, which precludes operation over distances of many km, a requirement, for example, in the oil industry.

A solution is offered in U.S. Pat. Nos. 6,069,686 and 5,963,531 by Wang et al, which teach a fundamental technique of measurement employing a single fibre optic line to measure temperature or pressure from an interferometric transducer at the distal end of the fibre optic line. The two US patents also teach how to make a miniature transducer and how to cause the transducer to measure temperature, strain or pressure.

The exact style of the transducer is not the subject of the present invention. The present invention can function with any style of optical transducer adapted to provide output indicative of the value of any parameter.

Wang et al teach a novel approach to such measurements. It was, up to that time, normal to measure the dimensions of an interferotmetric cell employing narrow band monochromatic light. Monochromatic light traversed the two paths of the interferometer cell. The two beams interfered with each other so that the intensity of the combined interfering beams varied with the path length difference of the transducer interferometer cell. However, there are many causes why the amplitude of the combined interfering beams would not remain constant and thus deliver an accurate measure of the size of the monitored parameter. The intensity of the light source can vary, both in the short term and in the long term. The amount of attenuation in the fibre optic line can vary due to aging, variation of coupler transmission and optical switches, and so on. The wavelength of the light source can vary. The measuring photo detector can change sensitivity. Every component can drift with time. All in all, up to that time, adequate accuracy could not be achieved when measuring from an interferometric transducer at the end of a fibre optical line with a readout system based on intensity measurement alone.

Wang et al introduced the novel concept of measuring the size of an interferometer path length difference with broad band light. This does not necessarily mean broad band in the sens of white light, or even coloured light, though both could be used, but at least broad band compared to the narrow band monochrome light previously used. The broad band light is sent down the fibre optic line, undergoes interference at the transducer and travels back up the fibre optic line.

Now, the broad band light covers too wide a spectrum to show significant interference between the two paths of the interferometer in the transducer. Thus, from the broadband point of view, the returned beam bears no information. In a very real sense, the broader the bandwidth of the broad band light, the better it is at suppressing the response of the transducer. The broad band return beam is also filtered through a narrow band filter. Now, narrow band is narrow band, no matter how it is derived. The previous art had used a narrow spectrum emitter. Wang et al get their narrow bandwidth by employing one or more filters that allow through passage of a range of frequencies. The interferometric transducer causes the amplitude of the narrow band filtered light to vary with the path length difference in the interferometer as the two beams interfere with each other.

Now, the narrow band beam of Wang et Al is, in fact, no better off than the previous art beam generated by the narrow band width emitter, being subject to much the same set of errors. However, Wang et al have the broad band beam for comparison. The broad band beam comes from the same light source, and follows the same path as the narrow band beam. In fact, it is effectively the same beam, since the narrow band is simply a filtered part of the whole. The narrow band return light varies in amplitude with transducer responses, the broad band substantially does not. If the amplitude of the broad band return beam varies, the amplitude of the narrow band return beam varies by the same proportion. It is thus merely necessary to take the ratio of the narrow band amplitude to the broad band amplitude to obtain an accurate measure of the effect of the interferometric transducer.

The present invention seeks to provide ways to improve the stability and accuracy of measurement using optical interferometric transducers, including fibre optic interferometric transducers.

According to a first aspect, the present invention consists in a measurement apparatus for an interferometric optical transducer, said apparatus employing a plurality of narrow band light beams, each on its own separated wavelength, each amplitude modulated by interference between the two paths of the transducer, and each filtered from a broad band beam returned from the transducer and which is substantially not amplitude modulated by interference in the transducer.

The first aspect of the invention provides that plural narrow band light beams produce a corresponding plurality of substantially sinusoidal responses with changing path length difference in the transducer, that the plurality of substantially sinusoidal responses display phase differences between one another, and that the phase differences can be employed to extend the range over which the transducer can supply a reliable output.

The first aspect further provides that the phase shifts change as the stimulus to the sensor changes, that each response has a normalized amplitude for each phase shift, that each stimulus has its own unique set of normalized amplitudes, and that the normalized amplitudes can be employed to determine the stimulus.

The first aspect further provides that there can be at least three narrowband beams with approximately a 120 degree phase shift between each other, or that there can be at least two narrow band beams with approximately 90 degrees phase shift between them.

According to a second aspect, the present invention consists of an apparatus for processing signals from a remote interferometer at the distal end of a fibre optic line, said apparatus comprising: means for supplying a broad band light beam; a beam splitter; a coupler for coupling said broad band light beam into a fibre optic line to be returned from an interferometric transducer at the distal end thereof and for coupling the returned beam from said fibre optic line into said beam splitter; where said beam splitter is operative to split said reflected light beam into at least three sub beams; at least one of said sub beams being broadband; at least two of said sub beams being narrow band and on different wavelengths; said apparatus comprising a receiver for measuring the amplitude of each of said sub beams; said different wavelengths being such that the amplitude of at least two of said at least two of said sub beams have a phase difference there-between; said apparatus being operative to use the phase difference to sense the path length difference of said remote interferometer.

The second aspect of the invention further provides an apparatus, operative to employ the relative amplitudes of said at least one broad band sub beam and at least one of said narrow band sub beams to sense the path length difference of said remote interferometer.

The second aspect of the invention further provides that the phase difference between three narrowband sub-beams can be substantially 120 degrees throughout the region of operation of the transducer.

The second aspect of the invention further provides that the phase difference between two narrowband sub-beams can be substantially 90 degrees throughout the region of operation of the transducer.

The second aspect of the invention further provides signal processing where the amplitudes of said two or more sub beams are individually employed to find the path length difference of said remote interferometer.

The second aspect of the invention further provides that a polarization scrambler can be employed to compensate for birefringence in the fibre optic cable.

The second aspect of the invention further provides that a single photo detector can be used to sample some or all of the sub beams by use of a shutter and beam combiner.

The second aspect of the invention further provides that the transducer can be deployed within a hydrocarbon well.

According to a third aspect, the present invention consists in an apparatus for processing signals from a remote optical transducer at the distal end of a fibre optic line, said apparatus comprising: means for supplying a broad band light beam; modulation means for causing said broad band light beam to be modulated in intensity to produce a repetitive narrow pulse of broad band light, said pulse having a width which is an insignificant fraction of the round trip time to and from the distal end of the fibre optic line, each pulse from said broad band light source producing a plurality of individually detectable reflected pulses; a single photo detector operative to respond to individual reflected pulses of light; pulse identification means to identify to which of said plurality of reflected pulses said single photo detector is responding at any time, and processing means to analyse the amplitude relationship between at least some of said plurality of individually detectable reflected pulses.

In a fourth aspect, the present invention consists in a method for processing signals from a remote optical transducer at the distal end of a fibre optic line, including the steps of: supplying a broad band light beam; modulating the broad band light beam in intensity to produce a repetitive narrow pulse of broad band light, said pulse having a width which is an insignificant fraction of the round trip time to and from the distal end of the fibre optic line, reflecting a plurality of individually detectable reflected pulses from each broad band light source pulse; responding to each individual reflected pulse of light; identifying to which of said plurality of reflected pulses said single photo detector is responding at any time, and analyzing the amplitude relationship between at least some of said plurality of individually detectable reflected pulses.

The third and fourth aspects of the invention provide that the repetition delay between the narrow light pulses can be longer than the round trip time for the light pulse to travel to and from the distal end of the fibre optic line, so that the plurality of reflections from one single light pulse is in the system at any one time.

The third and fourth aspects of the invention provide that the repetition delay between the narrow light pulses can be less than the round trip time for the light pulse to travel to and from the distal end of the fibre optic line, so that the plurality of reflections from one single light pulses can be in the system at any one time.

The third and fourth aspects of the invention further provide that the plurality of reflections from multiple light pulses can be interleaved at the photo detector.

The third and fourth aspects of the invention further provide that the processing means is operative to average the amplitude of each individual pulse at least some of said plurality of individual pulses over a plurality of pulse repetition periods.

The third and fourth aspects of the invention further provide that the pulse identification means can be responsive to the amplitude of at least one of the plurality of individually detectable reflected pulses to identify individual reflected pulses by their order of arrival.

The third and fourth aspects of the invention further provide that the pulse identification means can be responsive to the known light source pulse times and the measured and unchanging delays due to the fibre lengths.

The third and fourth aspects of the invention further provide that the remote optical transducer can be a pressure sensor, a temperature sensor, a flow rate sensor, a chemical property sensor, or a strain gauge among others.

The third and fourth aspects of the invention further provide that the distal end of the fibre optic line can be situated in the bore of a hydrocarbon well.

The third and fourth aspects of the invention further provide that the processing means can be operative to compare the amplitude of a returned broad band pulse from said transducer with the amplitude of a narrow band pulse filtered from said returned broad band pulse from said transducer, the narrow band pulse being sufficiently narrow for the path length difference in the transducer to cause amplitude modulation of the narrow band pulse, said processing means being operative to employ the comparison to provide indication of the value of the parameter measured by the transducer.

The third and fourth aspects of the invention further provide that the filtered narrow band pulse can be derived by reflecting the reflected broad band pulse from the transducer from a narrow band reflector at the distal end of a fibre optic delay line.

The third and fourth aspects of the invention further provide that the processing means can be operative to compare the amplitude of a reflected broad band pulse from said transducer with the amplitudes of a plurality of narrow band pulses, each having a different respective wavelength and each filtered from said reflected broad band pulse from said transducer, each narrow band pulse being sufficiently narrow for the path length difference in the transducer to cause amplitude modulation of that narrow band pulse.

The third and fourth aspects of the invention further provide that the plurality of narrow band pulses can each produce a substantially sinusoidal graph of amplitude versus path length difference in the transducer, at least two of the graphs having a perceptible phase difference.

The third and fourth aspects of the invention provide, for preference, that the phase difference can be substantially 120 degrees around the region of operation of the sensor.

The third and fourth aspects of the invention provide that the phase difference can be substantially 90 degrees around the region of operation of the sensor.

The third and fourth aspects of the invention provide, for preference, that the phase difference can be substantially 120 degrees around the region of operation of the sensor.

The third and fourth aspects of the invention further provide that the processing means can be operative to employ the comparison of at least three amplitudes of the plural amplitudes of the plurality of reflected narrow band pulses with the amplitude of the reflected broad band pulse, and to employ the amplitude and phase difference, to provide indication of the value of the parameter measured by the transducer.

The third and fourth aspects of the invention further provide that the plurality of reflected narrow band pulses can be provided by a plurality of narrow band reflectors deployed along a fibre optic line, between successive delay lines, to reflect a sample of the reflected broad band pulse from the transducer towards the single photo detector.

The third and fourth aspects of the invention also provide a broad band mirror, operative to return a reference pulse to said single photo detector which is subject to the same losses and spectral and polarization imbalances as the reflected broad band pulse from the transducer.

The third and fourth aspects of the invention also provide that the broad band mirror can be in-line with the transducer.

The third and fourth aspects of the invention also provide that the broad band mirror can be located close to and separated from the transducer by a transducer delay line.

The third and fourth aspects of the invention also provide that an optical switch can be included, providing the capability of multiplexing between a plurality of sensors with each having an in-line reflector.

The third and fourth aspects of the invention further provide that the measured amplitude of the reflected reference pulse can be used as a basis for comparison with the measured amplitude of one or more narrow band pulses to determine the value of the parameter measured by the transducer.

The third and fourth aspects of the invention also provide that the transducer delay line can have a delay which is half the delay of a delay line preceding a narrow band reflector, so that reference and sensor pulses interleave.

The third and fourth aspects of the invention also provide that the transducer delay line can have a delay which is "n" times or more the delay of a delay line preceding a narrow band reflector, so that reference and sensor pulses form separate sequences, where "n" equals the number of narrowbands plus the number of broadbands.

The third and fourth aspects of the invention further provides that the transducer cab be located in a hydrocarbon well and the reflector can be down the well or at the wellhead.

The third and fourth aspects of the invention further provide that a polarisation scrambler can be employed to eliminate the effects of birefringence and polarization-dependent losses in the fibre optic cable, connection splices, and optical switches.

The third and fourth aspects of the invention further provide that the losses in intensity of the light source and common components of the system can be compensated by calculating a narrowband compensation ratio and a broadband compensation ratio and taking the ratio of the two.

The invention is further explained, by way of an example, by the following description, taken in conjunction with the appended drawings, in which.

And

Figure 18:
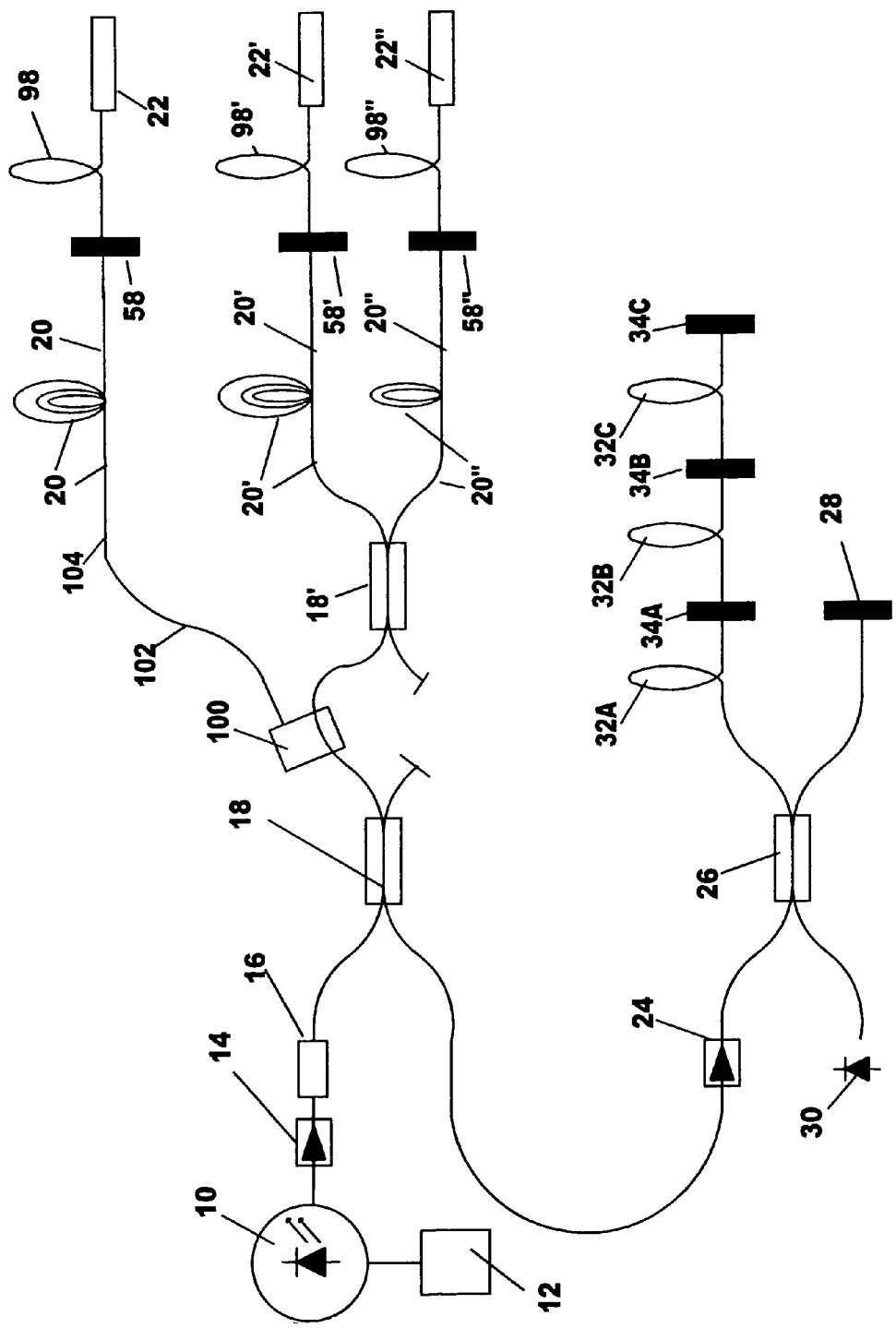
FIG. 18 is a schematic block diagram of another embodiment of the invention.

FIG. 19 is a graph of the light pulses received by the single photo detector when the embodiment of FIG. 18 is used.

Figure 1:
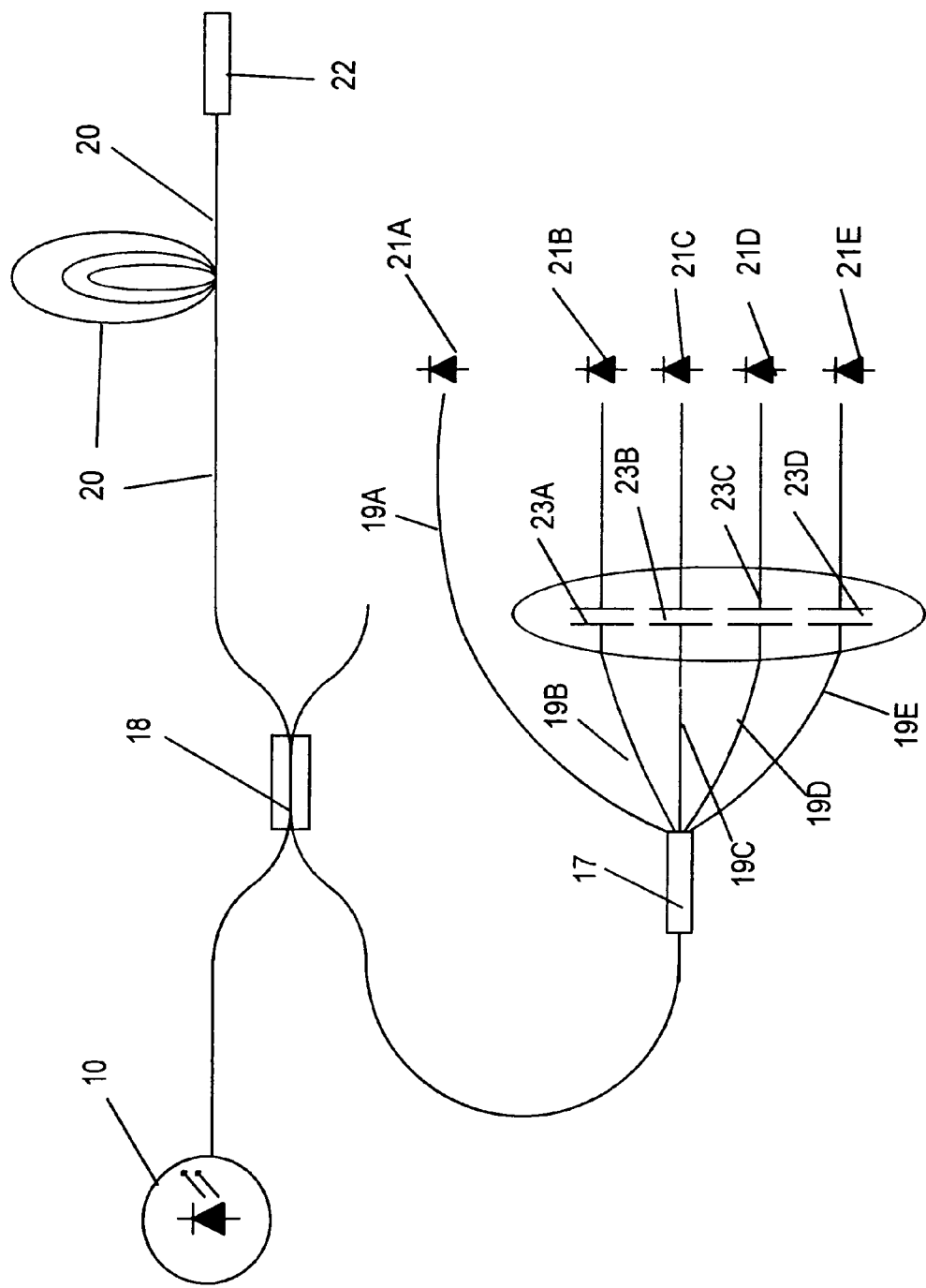
FIG. 1 is a schematic diagram of an apparatus, constructed according to the present invention.

Attention is drawn to FIG. 1.

A broad band light source 10 provides broad band light to a coupler 18 which couples broad band light to an optic fibre 20, which can be very many kilometres long and can descend into a hostile environment such as an oil, gas or other hydrocarbon well. At the far end of the optic fibre 20 is an interferometric sensor 22 which is designed to measure temperature, pressure or strain, among others. The sensor 16 can be similar to that used in U.S. Pat. Nos. 6,069,686 and 5,963,321.

At least a portion of the broad band light is returned back along the optic fibre 20 to the coupler 18 which couples it into a beam splitter 17. The beam splitter 17 splits the broad band return beam from the sensor 16, in this example, into five sub-beams 19A, 19B, 19C, 19D, 19E. One of the sub-beams 19A goes directly to its respective photo detector 21A. Its respective photo detector 21A is used to measure the broadband amplitude. The other sub-beams, 19B, 19C, 19D, 19E pass through a bank of filters 23A, 23B, 23C, 23D and thence onto their respective photo detectors, 21B, 21C, 21D, 21E. The filters 23A, 23B, 23C, 23D are each on a slightly different wavelength. The path length difference in the sensor 22 generates differing responses for each wavelength for each of the narrow band filters 23A, 23B, 23C, 23D. The bandwidth of each narrowband filter corresponds to a coherence length greater than two times the sensor gap. Hence, the light transmitted through each filter will exhibit strong interference. Because each filter is in a slightly different wavelength, the interference pattern exhibited by each wavelength on reflection by the sensor will be different. It is designed that the different wavelengths represented by the narrow band filters 23A, 23B, 23C, 23D mean that a significant and measurable phase difference exists between the amplitude responses of the different sub-beams.

Figure 2:
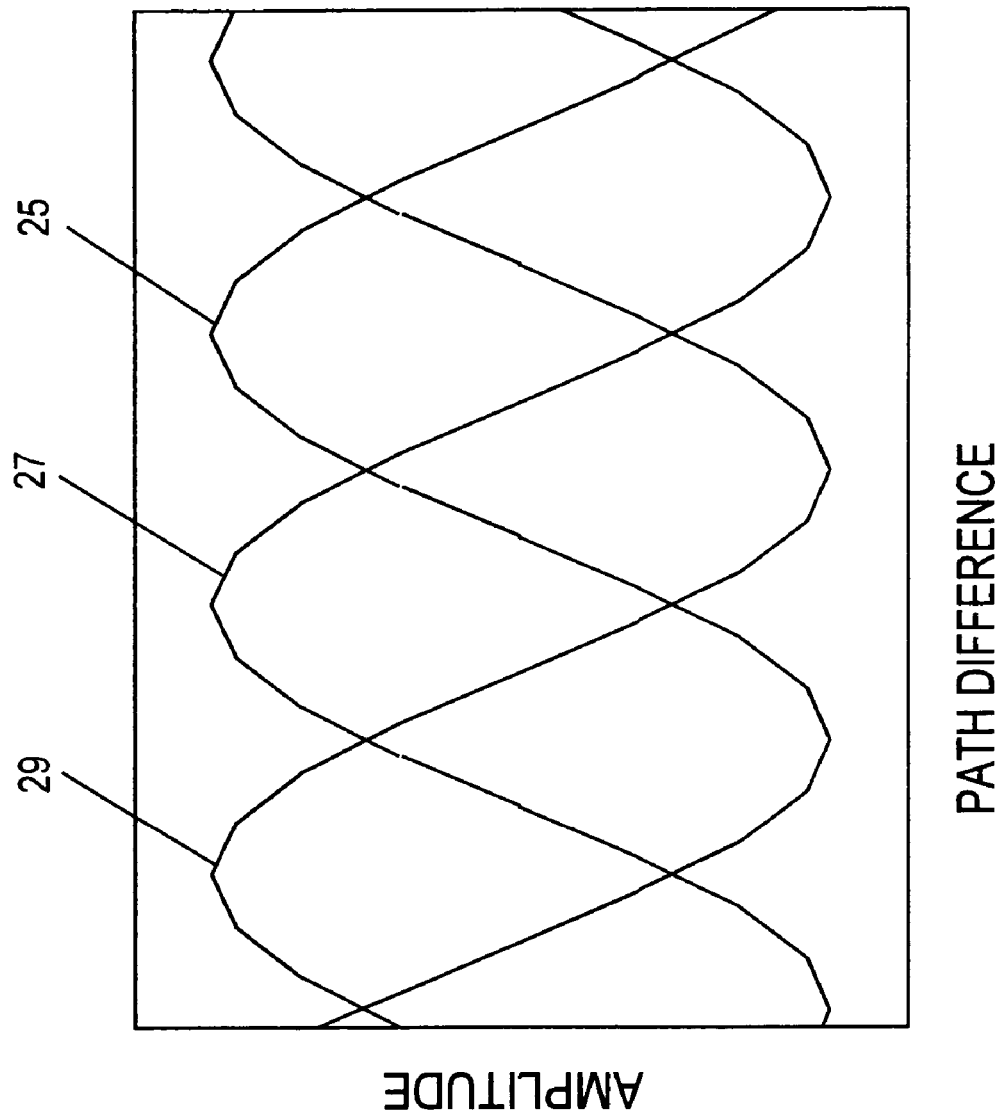
FIG. 2 is a graph illustrating the effect of different narrow band wavelengths in the amplitude responses generated.

Attention is drawn to FIG. 2, which shows what happens to the amplitude of different wavelengths as the path length difference of the sensor 22 alters. The path length difference is shown as the horizontal axis, while the amplitude perceived at the photo detectors 21 is shown as the vertical axis.

In FIG. 2, the graphs are drawn for three different center frequencies or wavelengths of the narrowband filters. A first graph 25 is for a first wavelength, a second graph 27 is for a second wavelength, and a third graph 29 is for a third wavelength. Preferably, the narrowband filters are chosen so that the response graphs shown in FIG. 2 have a phase difference of 120 degrees at or near the center of operation of the sensor range of stimulus values. Essentially, the phase shift between narrowband filter responses changes as the stimulus to the sensor 22 changes. At a particular phase shift for a certain stimulus, each narrowband filter will have a normalized amplitude (normalized against fibre and other losses). If at least three narrowband filters are chosen as above are used, each value of the stimulus will have its own unique set of normalized amplitudes. Thus, measurement is made of the normalized amplitudes, and this set of values is used to find the corresponding stimulus value thereby providing a reading of the measurand. A tabulation of stimulus values to their corresponding set of normalized amplitudes may be performed prior to operation. Alternatively, the stimulus can be determined from the normalized values by direct calculation or modeling. With this technique, it is possible to extend the range over which an accurate plot can be made to many times the limited monotonic range as described in U.S. Pat. Nos. 6,069,686 and 5,963,321.

It should be noted that this technique can function if the stimulus is constant. Nevertheless, when the stimulus is changing, the sense of the movement of the distance between the reflective surfaces on the sensor 16 can be given by the sense of change of the graphs 25, 27, 29. If we consider only 25 and 29, there are regions where the first graph 25 and the third graph 29 are both rising, regions where the first graph 25 is falling and the third graph 29 is still rising, regions where the first graph 25 and the third graph 29 are both falling, and regions where the first graph 25 is rising while the third graph 29 is falling. By looking at the sequence, it is possible to know whether stimulus is increasing or decreasing.

It should also be noted that some sensors may require compensation from other parameters. For instance, pressure sensors may have to be compensated by temperature measurements in order to provide accurate pressure readings. The second parameter compensation can be incorporated into the calculations, as is known in the prior art.

Figure 3:
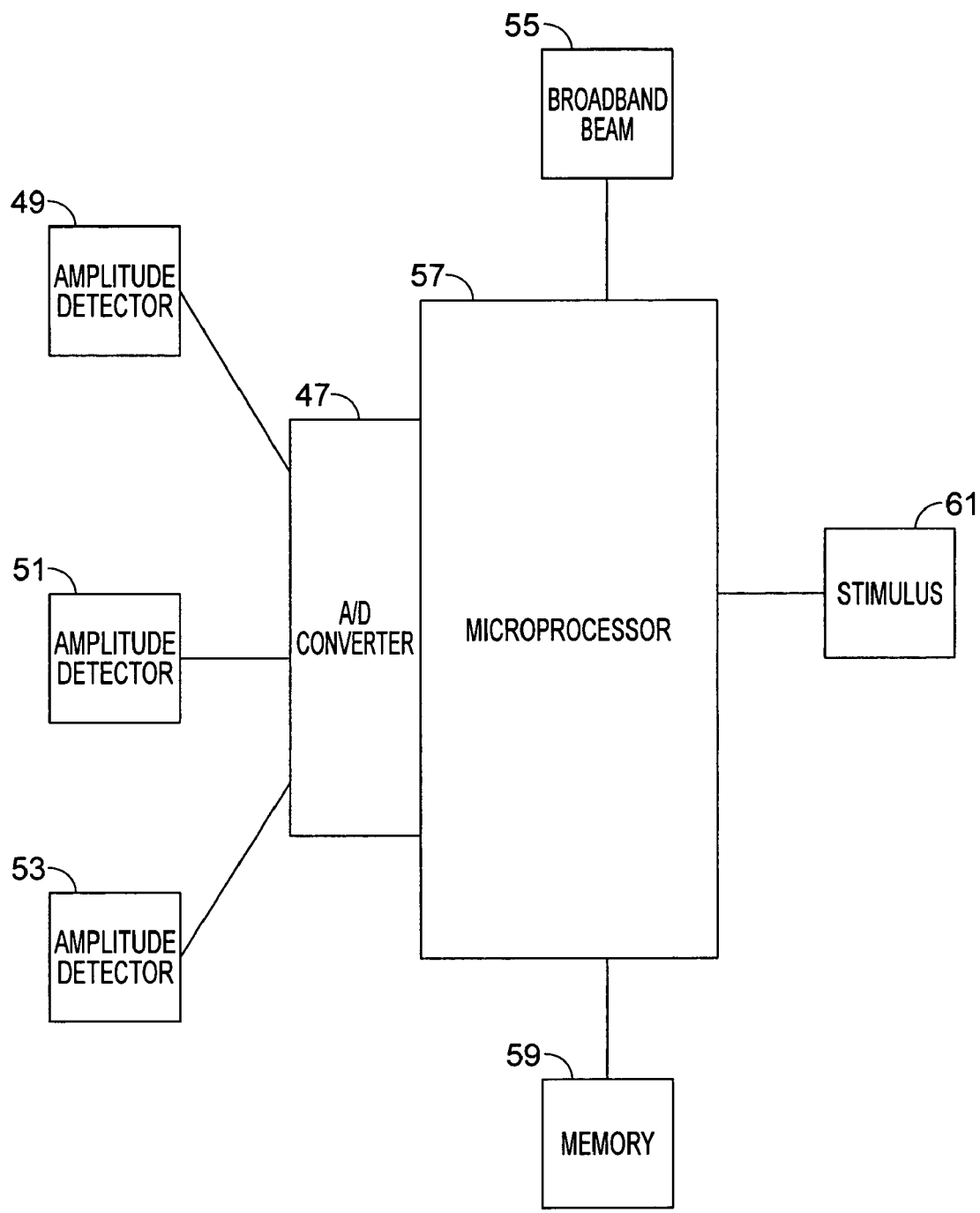
FIG. 3 is a block diagram showing different methods of signal processing according the invention.

Attention is drawn to FIG. 3, which shows a block diagram of one way in which the signal processing can take place for the present invention.

While the graphs of FIG. 2 show three narrow band sub-beams 29, 27, 25 and FIG. 1 shows four narrow band sub-beams 19A, 19B, 19C, 19D, it is to be appreciated that, to function, the invention requires a minimum of two or three narrow band sub-beams. Although not required, a broad band sub-beam, such as that corresponding to photo detector 22A may also be used.

Given a certain stimulus and thus phase shift between the narrowband filter responses, the output of each of the three narrowband reflectors passes through its photo-detector 21B-21D and into an amplitude detector 49, 51, 53. Each amplitude value is then passed through an analogue-to-digital converter 47 (which can be separate converters for each wavelength) to a microprocessor 57. Concurrently and if a broadband beam 55 is also used, the output from the broadband beam passes through its photo-detector 21A and into the microprocessor 57. The microprocessor 57 may then normalize each narrowband amplitude value (against the broadband value if used) and also take a time average of the narrowband amplitude value. Having the amplitude values of at least three narrowband filters, microprocessor 57 is then able to determine the unique stimulus 61 associated with the three amplitude values, such as by using a table, direct calculation, or modeling. Relevant information, such as the table, equations, or models, can be stored in memory 59. It is understood that FIG. 3 is only one example of the circuit by which the output from the photo-detectors can be manipulated to determine the stimulus, as described above.

Figure 4:
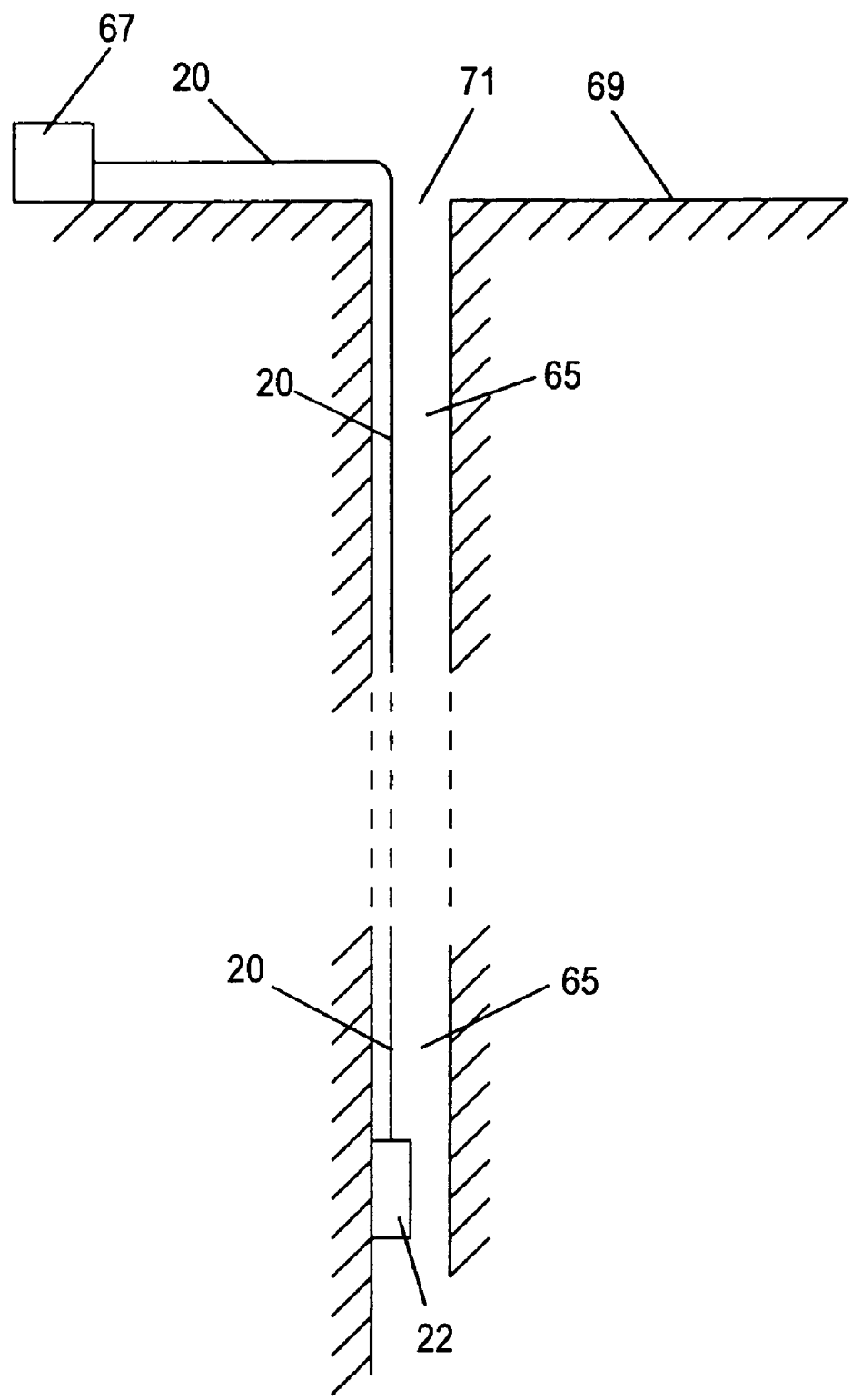
FIG. 4 is a depiction of the invention deployed down a well bore.

The invention can employ just a single photo detector which can be used to sample the sub beams by use of a shutter for each sampled beam and beam combiner directing the sub beams onto the single photo detector, thus eliminating the variance which exists between individual photo detectors 21 and increasing the accuracy of the measurement process. The output of the single photo detector can be provided to a microprocessor via an analog to digital converter and the amplitudes of the individual samples compared in the microprocessor. The invention can also function with two narrow bandwidth beams at ninety degrees to each other, together with one broad band beam. Some or all of these processes can be achieved using solid state electronics Attention is next drawn to FIG. 4, showing how the invention can be deployed with the sensor 22 down a well bore 65 such as might be used in the hydrocarbon industry for the extraction of oil or gas, the optic fibre 20 passing from surface equipment 67 at the surface 69 down the well bore 65 to the optical sensor 22. The surface equipment 68 can be as far as several kilometres away from the well head 71, the well bore 65 can be as much as several kilometres deep, the sensor 22 can be as much as several kilometres down the well bore 65, and the well bore 65 need not be vertical, as shown, but can be inclined and comprise side galleries and sections at many different angles. In this example, the surface equipment 67 comprises all of the items 10 18 17 19A-E 21A-E 23A-D shown in FIG. 1. In all of the other embodiments of the invention shown herein, it is to be appreciated that deployment down a well bore, such as that shown in FIG. 1 is also envisaged, with all items shown to be at the distal end of the fibre optic 14 deep within the well bore, and all items shown to be proximate to the proximal end of the fibre optic at the surface 69 as surface equipment 67.

Figure 5:
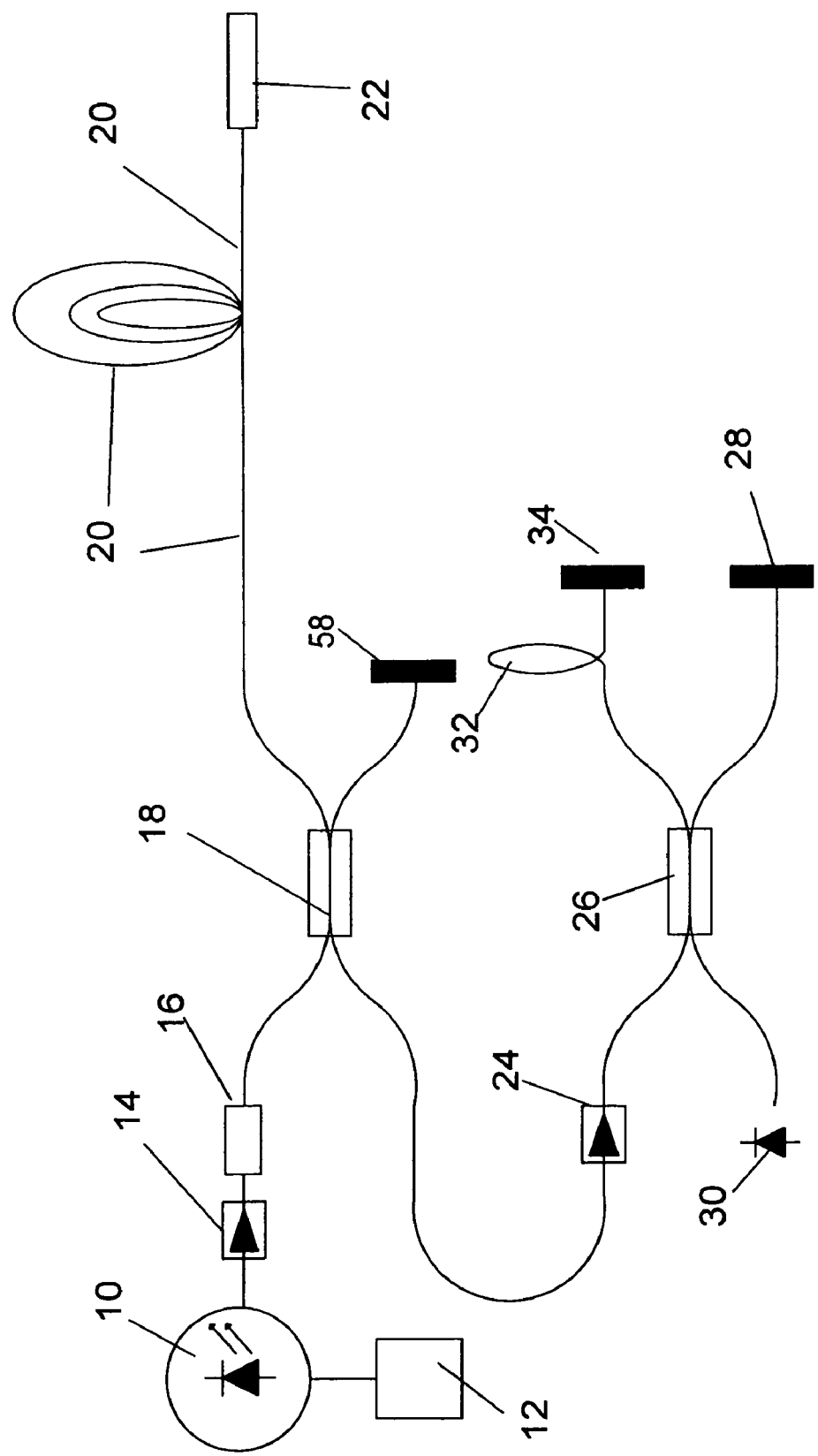
FIG. 5 is a schematic diagram of an apparatus, constructed according to a another embodiment of the present invention employing a single narrow band reflective mirror.

Attention is drawn to FIG. 5, showing an apparatus, constructed according to another embodiment of the present invention employing a pulsed broad band light source.

A pulsed broadband light source 10 is repetitively driven by a light source modulator 12 to emit narrow light pulses of the order of a few microseconds or less long via a first optical isolator 14 and a polarisation scrambler 16 to deliver, on average, pulses of randomly polarised light through a first coupler 18 to a fibre optic line 20 at the distal end of which an interferometric sensor (transducer) 22 is situated. The sensor 22 may be at the distal end of many kilometres of fibre optic line 20 and can be situated in a hostile environment such as a hydrocarbon well. It is noted that sensor 22 can be any type of optical sensor measuring any of a number of parameters, as previously discussed.

The polarisation scrambler 16 solves the problem of drift in the birefringence of the fibre. Variations of fibre birefringence combined with polarisation dependent loss in subsequent components (for example, the coupler 12) will result in an unwanted amplitude modulation of the optical signal, the amplitude modulation generally being wavelength dependent. A polarisation scrambler 16 can also be inserted in the path between the first coupler 18 and the second coupler 26. The normal solution to this problem is to use a Lyot depolariser, which averages the state of polarisation over the spectrum of the light source 10 to give an average output which is polarisation independent. However, it has been found that the narrow band channels and pulses have insufficient spectral widths to be effective in spectrally averaging the state of polarisation. The polarisation scrambler 16 is a device having a continuously varying birefringence as a function of time, resulting in a time averaged (over the duration of the acquisition of the signal) output which has a uniform power distribution on the surface of the Poincare sphere. As a result, the signal from the sensor becomes independent of the birefringence and polarization-dependent losses of the fibre optic cable 20 and other components in the light path.

The interferometric sensor 22 returns the incident broadband narrow pulse back towards the first coupler 18 which sends the returned pulse through a second optical isolator 24 to a second coupler 26.

The returned beam arrives first at a first broadband mirror 28, from whence the reflected broadband pulse is directed to a single photo detector 30. The single photo detector 30 is a high speed device capable of resolving individual reflected pulses.

The returned broadband pulse from the sensor 22 goes through a delay line 32 in the form of several hundred metres of fibre optic cable before being reflected by a narrow band mirror 34 which reflects only a narrow band sample of the broadband pulse reflected from the sensor 22. The narrow band pulse goes back through the delay line 32 and is also, after a period separated from the detection of the broadband pulse reflected from the sensor 22 by twice the delay of delay line 32A, detected by the single photo detector 30.

In one embodiment, the time between repetitions of the pulse modulation of the light source modulator 12 is longer than the round trip down the fibre optic line 20 and back again. In other embodiments, however, the system can operate with one or more pulses in the system at the same time, provided that none of the reflected pulses overlap. As will also be described herein, the light pulses may even be transmitted so that the train of reflected pulses from each light pulse are interleaved.

Figure 6:
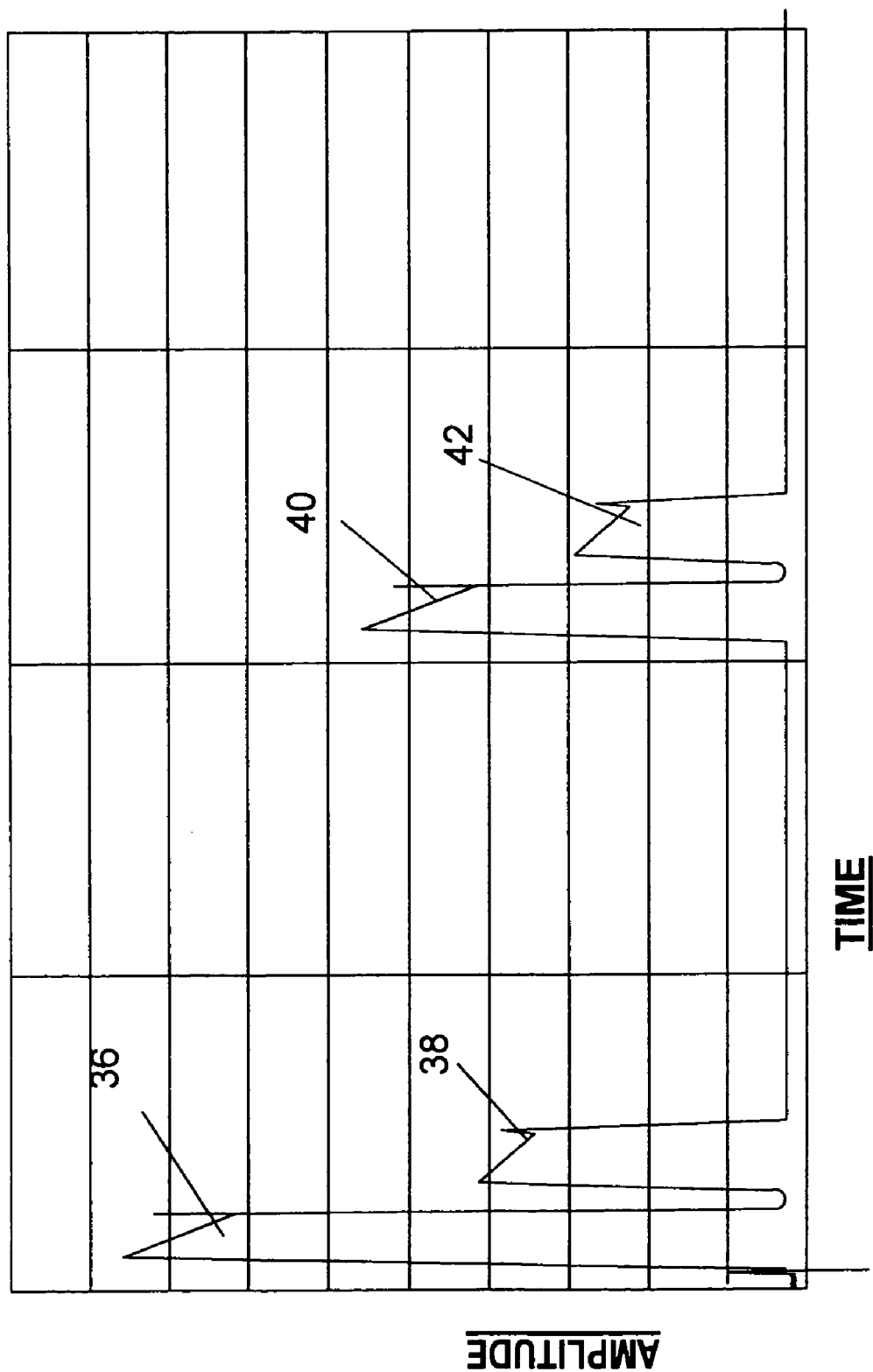
FIG. 6 is a graph illustrating the pulsed light signals detected by the single photo detector when used by the embodiment of FIG. 5.

Attention is also, at this stage, drawn to FIG. 6, showing exemplary pulses as observed in the system of FIG. 1, in response to a single pulse of light from the light source 10.

A second broad band mirror 58 is provided on the first coupler 18 which serves to reflect the initial light pulse from the light source 10 back towards the second coupler 26, onto the broad band mirror 28, and thence onto the single photo detector 30.

A first pulse 36 occurs at the single photo detector 30 as the light pulse is launched down the fibre optic line 20 and, at the same time, bounces off the second broad band mirror 58, back through the first coupler 18, onto the broad band mirror 28 and bounces back through the second coupler onto the single photo detector 30. A second pulse 38 occurs a very short time thereafter as the pulse from the light source 10 is delayed and bounced from the narrow band mirror 34 through the second coupler 26 onto the single photo detector 30.

After a period equal to the time taken for the light pulse from the light source 10 to reach the sensor 22 and be reflected back along the fibre optic line 20, a third pulse 40 appears, being the returned broadband pulse from the sensor 22 having again been reflected by the broadband mirror 28 through the second coupler 26 onto the single photo detector 30. A short time thereafter, a fourth pulse 42 reaches the single photo detector 30, being the returned broadband light pulse from the sensor 22, delayed by the delay line 32 and bounced, to become a narrow band reflection from the narrow band mirror 34, back through the delay line 32 and the second coupler 26 to the single photo detector 30. These two pulses 40, 42, are employed to measure the path length difference in the sensor 22 and thus give a measure of the pressure, flow rate, chemical property, strain or temperature to which the sensor 22 is subjected.

The first pulse 36 and the second pulse 38 can be used to confirm the onset of a timing epoch and to compensate the losses in intensity of the light source and in the common components of the system (also true for all other embodiments). For instance, an operator, such as by use of a computer or microprocessor of the system, can calculate the compensation ratio of the broadband by dividing the amplitude of pulse 40 by the amplitude of pulse 36 and the compensation ratio of the narrowband by dividing the amplitude of pulse 42 by the amplitude of pulse 38. Then, the sensor reflection compensation ratio is calculated by dividing the narrowband ratio by the broadband compensation ration. The sensor reflection calibration ratio can then be used to calibrate the sensor reading to provide an accurate measurement of the measurand. As mentioned earlier, this calibration technique can also be used in systems including multiple narrowbands, such as those shown and described in relation to FIGS. 6 and 10. The only difference would be that additional ratios are required in cases of multiple narrowbands.

Figure 7:
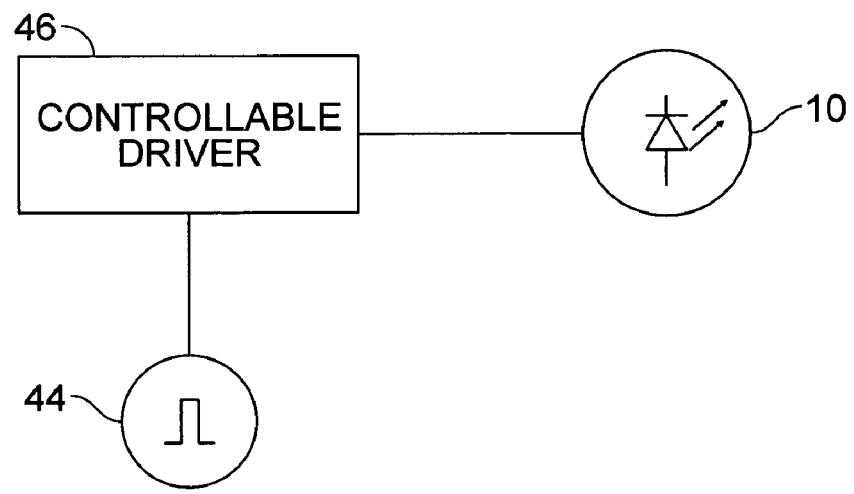
FIG. 7 is a block diagram showing a first method whereby the broad band light source can be pulsed.

FIG. 7 shows a first way in which the light source 10 can be modulated. A pulse source 44 drives a controllable driver 46, which delivers controlled current, voltage or both to the light source 10 under the control of the pulse source 44.

Figure 8:
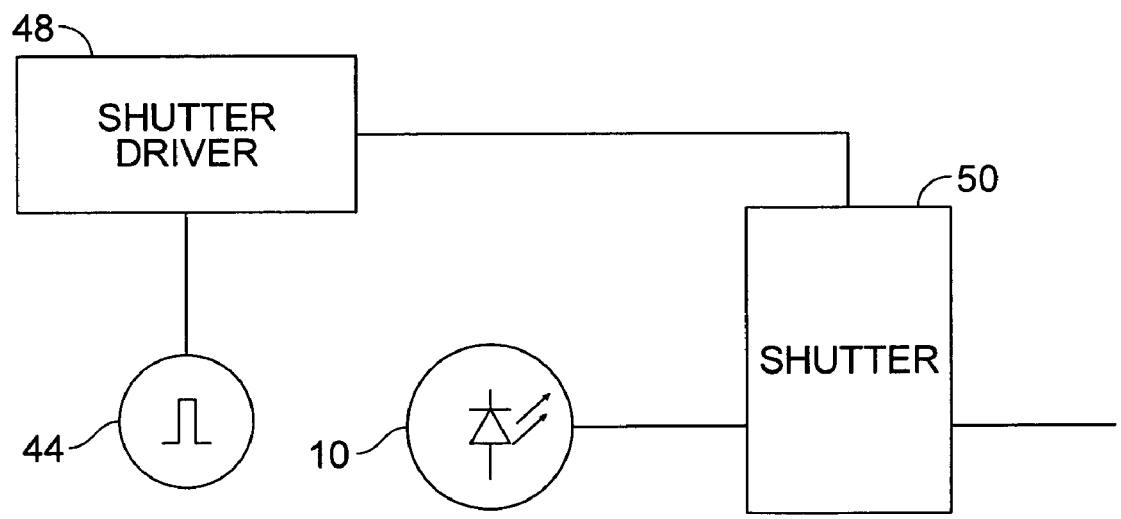
FIG. 8 is a block diagram showing a second method whereby the broad band light source can be pulsed.

FIG. 8 shows another exemplary manner in which the light source 10 can be pulsed where the pulse source 44 controls a shutter driver 48 which briefly opens a shutter 50 to allow through passage of a pulse of light from light source 10. The shutter 50 can be a liquid or acousto-optic crystal or any other electronically switchable optical device or, in large or slow systems, can even be mechanical.

Figure 9:
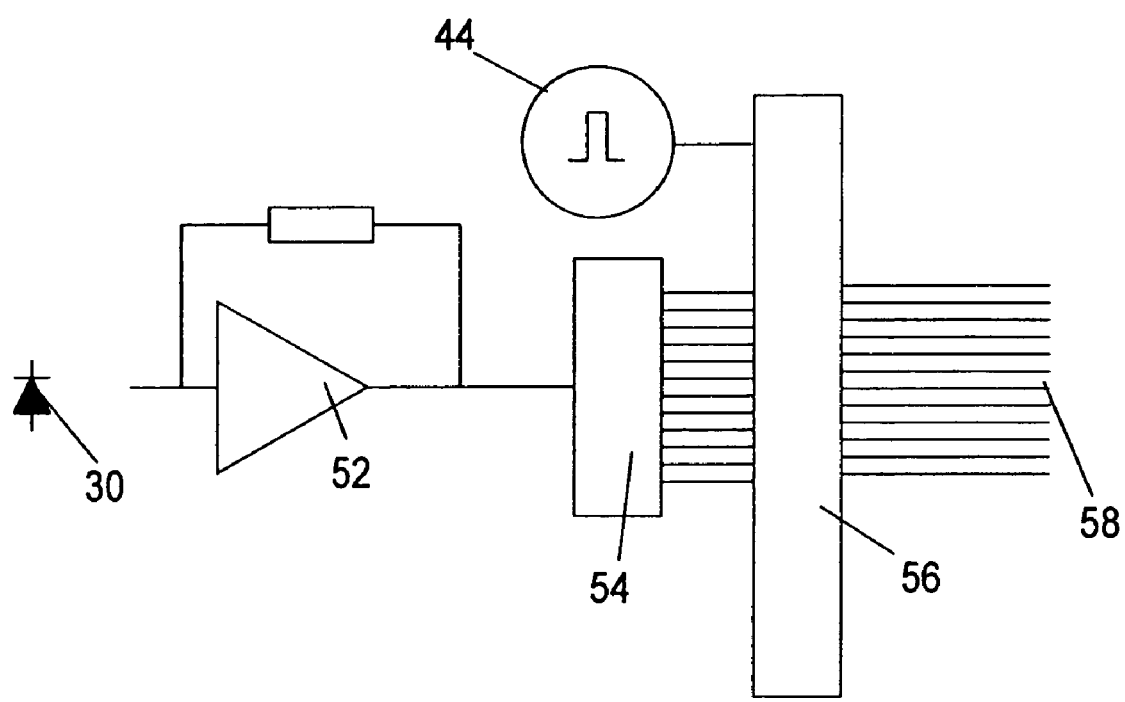
FIG. 9 is a block diagram showing one way in which the output from the high speed single photo detector can be fed to a microprocessor and processed.

FIG. 9 is a block diagram showing an example of how the first embodiment of the invention can handle the signals from the single photo detector 30.

The high speed single photo detector 30 is coupled to a high speed photo detector amplifier 52 whose analogue output is provided as the analogue input to a high speed analogue to digital converter 54. The digital output of the analogue to digital converter 54 is provided as digital input to a microprocessor 56. In one mode of operation, the microprocessor can identify which pulse 36, 38, 40, 42 it is receiving at any particular time by noting the larger amplitude of the first pulse 36 and then counting the order of arrival of each subsequent pulse 38, 40, 42 to know which pulse it is actually measuring. Alternatively, the pulse source 44 can have its pulse output also coupled to the microprocessor 56 so that identification of the first pulse 36 becomes unnecessary. The pulses can also be identified from the sequence. The microprocessor 56 can itself control the triggering of the pulsed light source. Alternatively, the microprocessor 56 can know which pulse it is measuring by knowing when the pulses are transmitted by the source and knowing the delays due to the fibre lengths (thereby knowing when a given pulse is expected to be received).

For better accuracy, the microprocessor 56 can separately average the values of the broadband pulses 36 and 40 and of the narrow band pulse 40 and 42 (as well as all other received pulses) over successive timing epochs.

The band width of the reflected broadband pulse 40 is such that variation of the path length difference in the sensor 22 has no significant effect on its amplitude. However, the light reflected by the narrow band reflector 34, seen in the fourth pulse 42, is of sufficiently narrow bandwidth that, as the path length difference in the sensor 22 changes (as with change of pressure), so the narrow band pulse 42 is modulated by interference to provide a substantially sinusoidal amplitude graph with path length difference in the sensor 22. The sensor 22 is chosen to operate over a portion of the sinusoidal graph where the second pulse 42 steadily increases in value or steadily decreases in value with change of stimulus.

The system is subject to many losses and uncertainties as the narrow band pulse goes to and returns from the sensor 22. Because the narrow band pulse 42 is filtered from the broad band pulse 40, both the broad band pulse 40 and the narrow band pulse 42 are subject to equal amounts of attenuation due to the fibre optic line 20 and various couplers and couplings throughout the system. Thus, if the amplitude of the broad band pulse 40 changes, the amplitude of the narrow band pulse 42 changes by the same proportion. Moreover, the pulses can be compensated, as previously discussed in relation to compensation ratios.

The microprocessor 56 thus finds the ratio or the amplitudes of the broadband pulse 40 to the amplitudes of the narrow band pulse 42 and provides this as a digital output indicative of the pressure to which the sensor 22 is subject.

Figure 10:
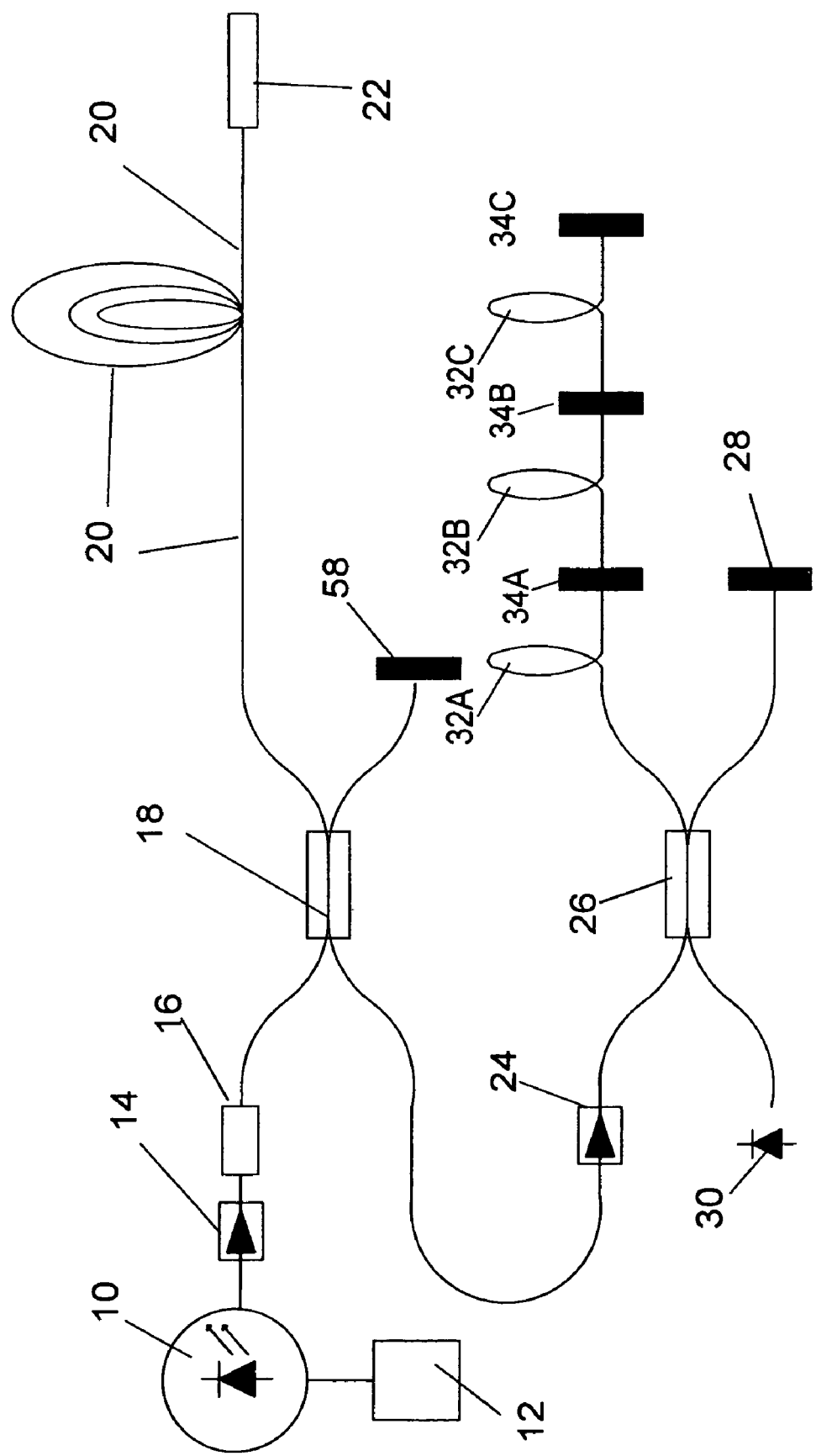
FIG. 10 is a schematic diagram of an apparatus, constructed according to another embodiment of the present invention employing a plurality of narrow band reflectors.

Attention is drawn to FIG. 10, showing an apparatus according to a second embodiment of the present invention.

Everything in FIG. 10 with a corresponding number is the same object as is seen and described with respect to FIG. 5. The difference between FIG. 10 and FIG. 5 is that the single delay line 32 and single narrow band mirror 34 of FIG. 5 have been replaced by a concatenation of delay lines 32A, 32B, 32C, each having its own respective narrow band mirror 34A, 34B, 34C, each of the plurality of narrow band mirrors 34A, 34B, 34C being on a slightly different wavelength.

Figure 11:
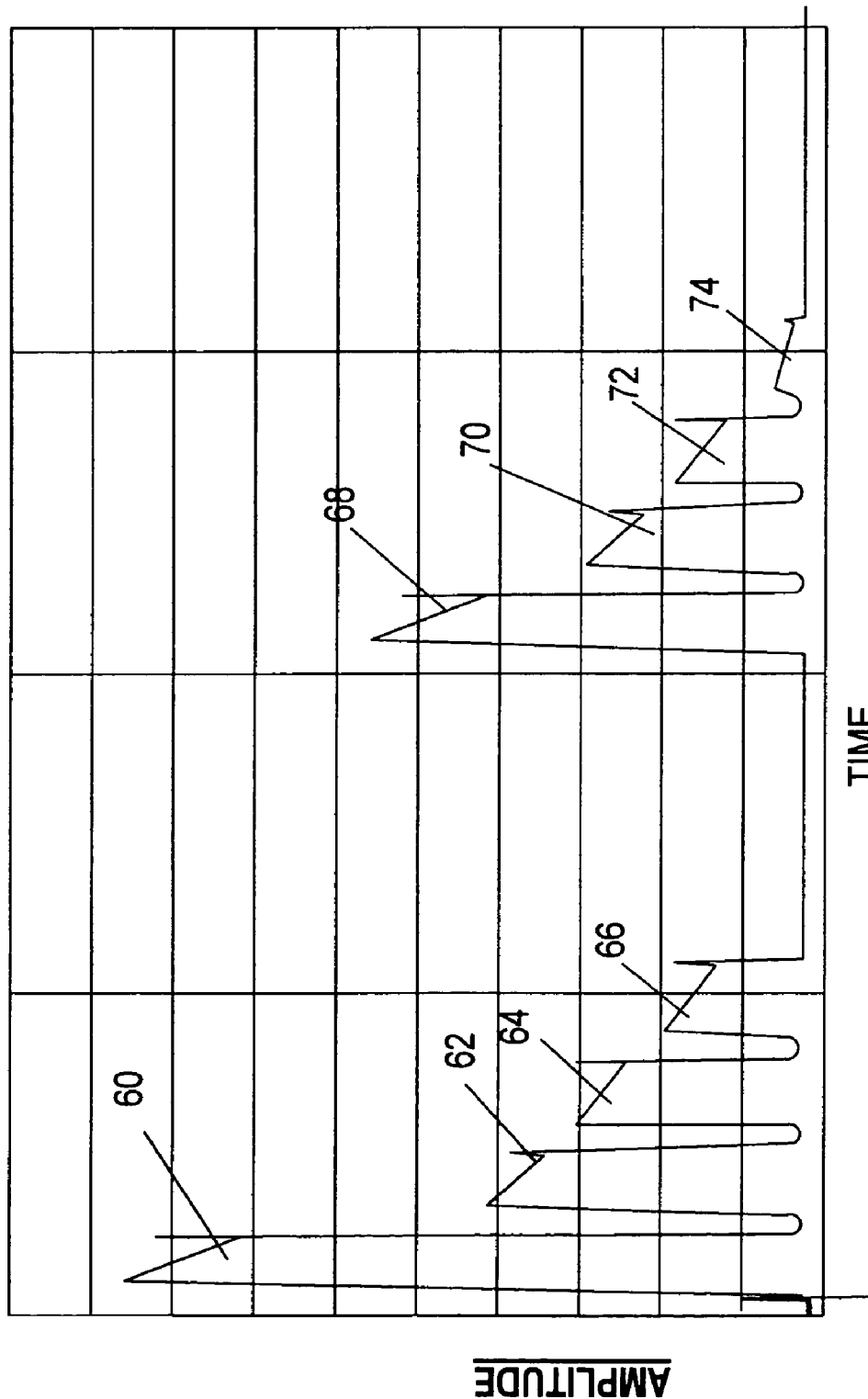
FIG. 11 is a graph showing exemplary reflected light pulses within the apparatus of FIG. 10.

FIG. 11 shows a graph of the detected output of the single photo detector 30 of FIG. 10.

The first pulse 60 is the result of the emitted pulse of light from the light source 10 passing through the first coupler 18, bouncing off the second broadband mirror 58 back through the first coupler 18, through the second coupler 26, onto the broadband mirror 28, and back through the second coupler 26 to be detected by the single photo detector 30. The second pulse 62, the third pulse 64 and the fourth pulse 66 are, respectively, the emitted pulse from the light source 10 being reflected onto the photo detector 30, having been reflected from the second broad band mirror 58, and delayed by the first narrow band reflector 34A and the first delay line 32A, from the second narrow band reflector 34B and the second delay line 32B, and from the third narrow band reflector 34C and the third delay line 32C. These first set of pulses can be used as previously described in relation to FIGS. 5 and 6.

After a specific time as previously disclosed, a fifth pulse 68 appears, being the broadband pulse returned from the sensor 22 and from the first broadband mirror 28 onto to the single photo detector 30. Shortly thereafter, a sixth pulse 70 followed by a seventh pulse 72 and an eighth pulse 74 appear. These pulses 68 70 72 74 are the narrow band pulsed derived from the returned broad band pulse (from the sensor or transducer 22) and reflected from the narrow band mirrors 34A 34B 34C separated by twice the delay of each delay line 32A 32B 32C traversed. These pulses, 68, 70, 72, 74, are used in this invention to determine the path length difference in the interferometric sensor 22.

The output from the single photo detector 30 in FIG. 10 is processed as shown in FIG. 9 and in the same manner as for the embodiment of FIG. 5, with the exception that the microprocessor 56 can perform a different calculation.

Figure 12:
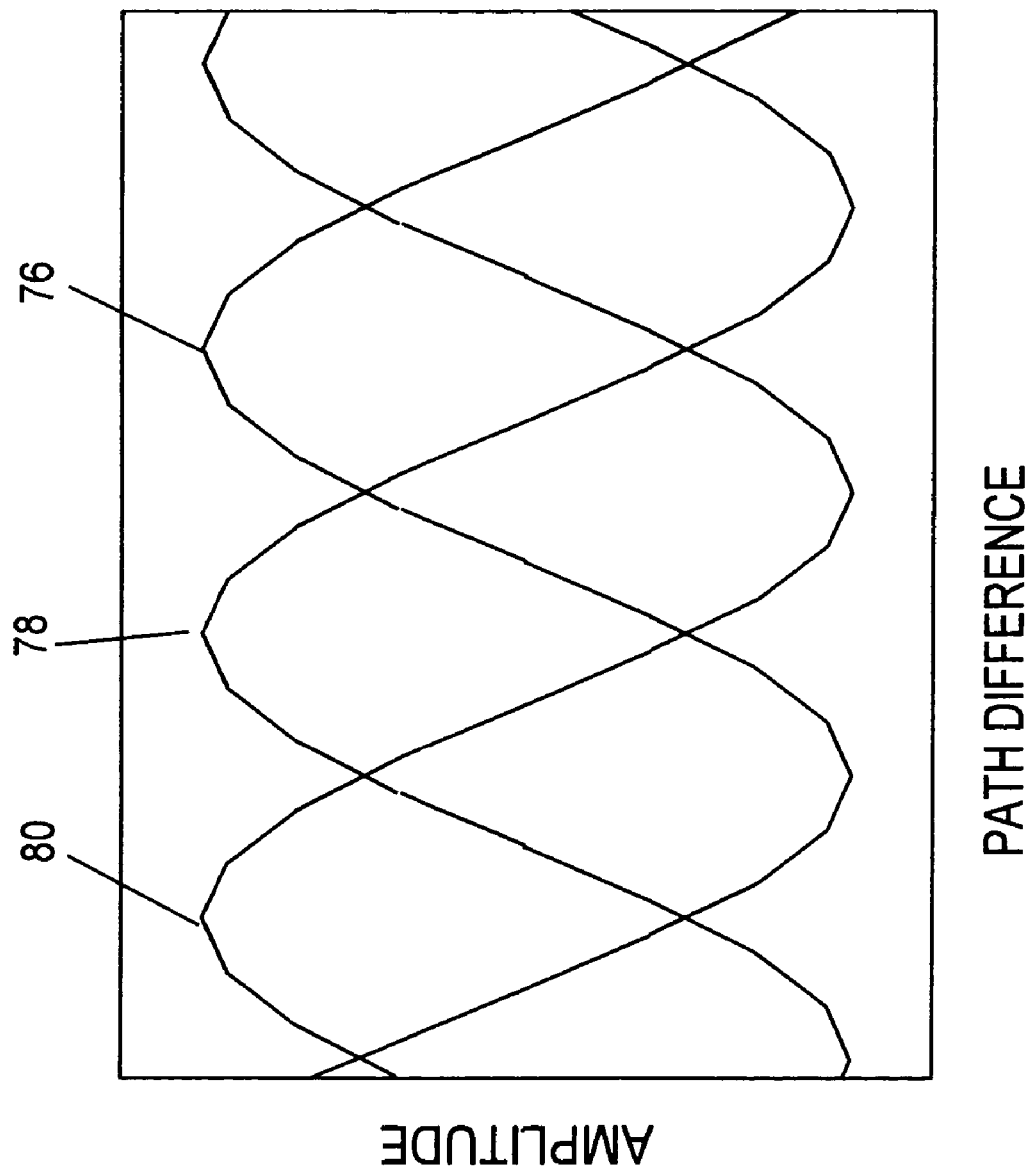
FIG. 12 is a graph of the amplitude of the reflected narrow band light pulses from the transducer against distance between reflective surfaces in the transducer, there being three different wavelengths.

Attention is drawn to FIG. 12, showing a graph of the path length difference of the interferometric sensor 22 and the output as measured by the single photo detector 30 for each of the sixth second embodiment pulse 70, seventh second embodiment pulse 72, and the eighth second embodiment pulse 74. Three graphs are produced—a first graph 76, a second graph 78, and a third graph 80. Each graph is out of phase with the others because of the difference in wavelength of the plurality of narrow band filters 34A, 34B, 34C.

Preferably, the narrowband filters are chosen to have a phase difference of 120 degrees at or near the center of operation of the sensor range of stimulus values. Essentially, the phase shift between narrowband filter responses changes as the stimulus to the sensor 16 changes. At a particular phase shift for a certain stimulus, each narrowband filter will have a normalized amplitude (normalized against fibre and other losses). If at least three narrowband filters are chosen as above are used, each value of the stimulus will have its own unique set of normalized amplitudes. Thus, measurement is made of the normalized amplitudes, and this set of values is used to find the corresponding stimulus value thereby providing a reading of the measurand. A tabulation of stimulus values to their corresponding set of normalized amplitudes may be performed prior to operation. Alternatively, the stimulus can be determined from the normalized values by direct calculation or modeling. With this technique, it is possible to extend the range over which an accurate plot can be made to many times the limited monotonic range as described in U.S. Pat. Nos. 6,069,686 and 5,963,321.

It should be noted that this technique can function if the stimulus if constant. When the stimulus is changing, the sense of the movement of the distance between the reflective surfaces on the sensor 22 can be given by the sense of change of the graphs 76, 78, 80. Measurement based on movement is not necessary, but can be done. If we consider only 76 and 80, there are regions where the first graph 76 and the third graph 80 are both rising, regions where the first graph 76 is falling and the third graph 80 is still rising, regions where the first graph 76 and the third graph 80 are both falling, and regions where the first graph 76 is rising while the third graph 80 is falling. By looking at the sequence, it is possible to know whether the gap between the stimulus is increasing or decreasing.

It should also be noted that some sensors may require compensation from other parameters. For instance, pressure sensors may have to be compensated by temperature measurements in order to provide accurate pressure readings. The second parameter compensation can be incorporated into the calculations, as is known in the prior art.

Figure 13:
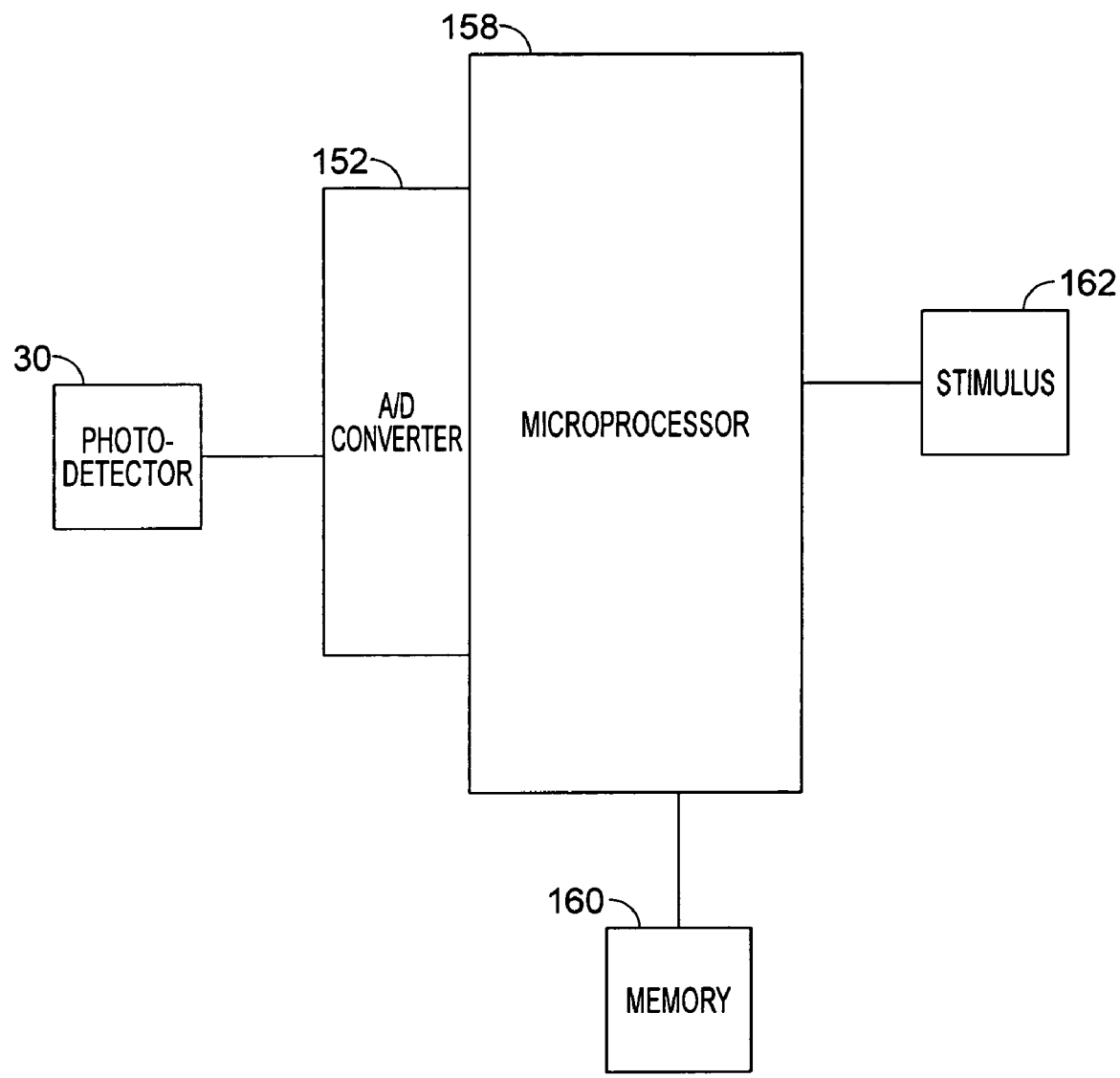
FIG. 13 is a scheme of working for the microprocessor of FIG. 5, showing how the plural narrow band reflectors of FIG. 6 can be used to extend the range over which the distance between the reflective surfaces of the transducer can be accurately measured.

FIG. 13 shows an exemplary mechanism that can be used to determine the set of normalized amplitudes and then the stimulus. This can also be achieved using solid state electronics. Given a certain stimulus and thus phase shift between the narrowband wavelengths, each of the pulses from the narrowband and broadband reflectors is measured by the photo-detector 30, and passes through an analogue-to-digital converter 152 to a microprocessor 158. The microprocessor 158 knows which pulse corresponds to which reflector, as previously described. Also as previously described, the microprocessor 158 may then normalize each narrowband amplitude value (against the broadband value if used) and also take a time average of the narrowband amplitude value. Having the amplitude values of at least three narrowband filters, microprocessor 158 is then able to determine the unique stimulus 162 associated with the three amplitude values, such as by using a table, direct calculation, or modelling. Relevant information, such as the table, equations, or models, can be stored in memory 160. It is understood that FIG. 13 is only one example of the circuit by which the output from the photo-detector can be manipulated to determine the stimulus, as described above.

The microprocessor can also divide the amplitude ratio of the narrowband reflected pulses 70 72 74 to the corresponding pulses 62 64 66 by the ratio of the broadband reflected pulses 68 60 to derive a system compensation ratio.

The embodiment can be changed by providing that the coupler 18, 26 can be replaced by one or more circulators which would have lower losses. Fibre amplifiers can be used to boost the power of the light source 10 and to pre-amplify the signals.

Figure 14:
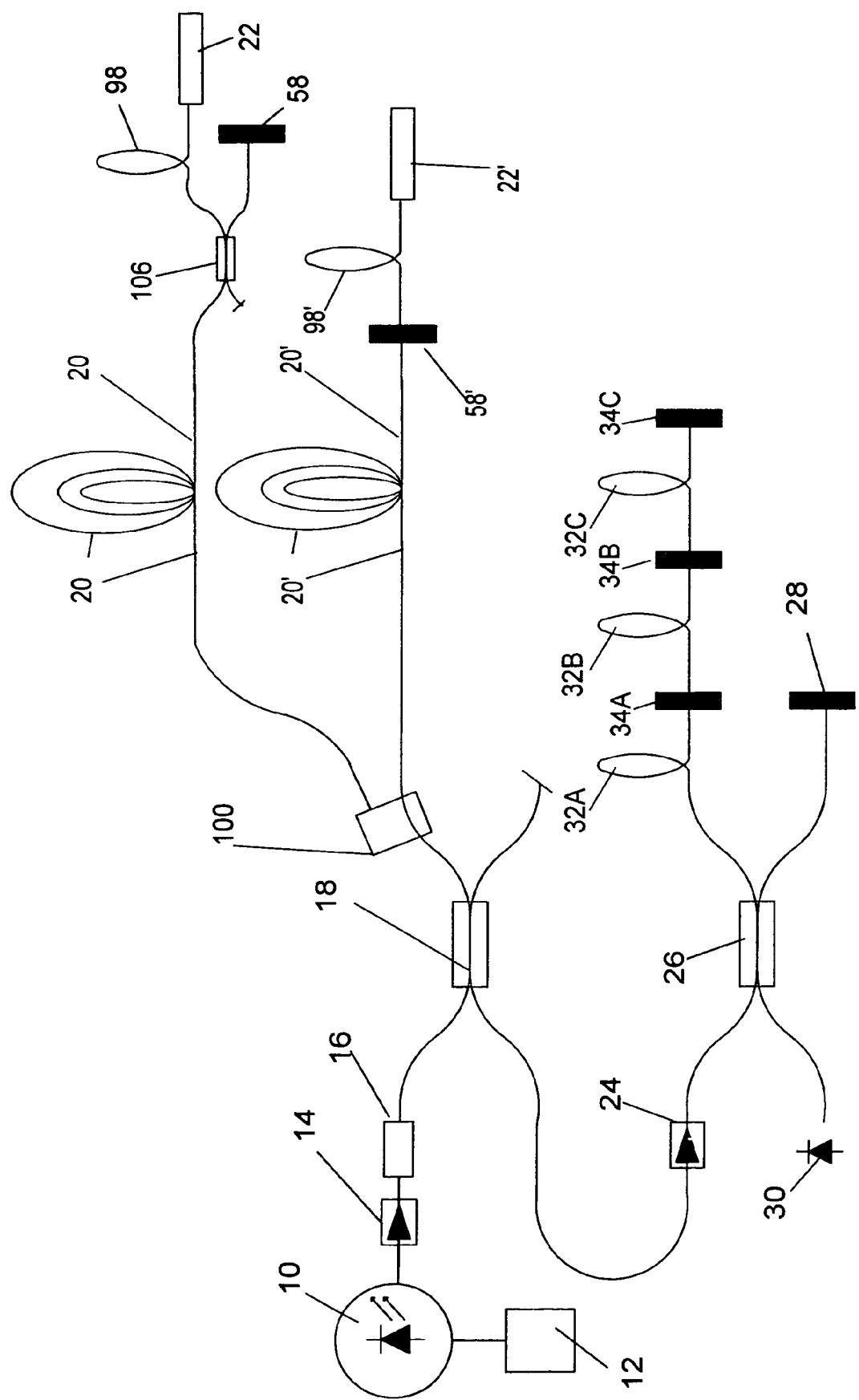
FIG. 14 is a schematic diagram of a third embodiment of the present invention, differing from FIG. 6 in that a broad band mirror has been moved to a point close to the transducer, with a plurality of such broad band mirrors and transducers connected using an optical switch.
Figure 15:
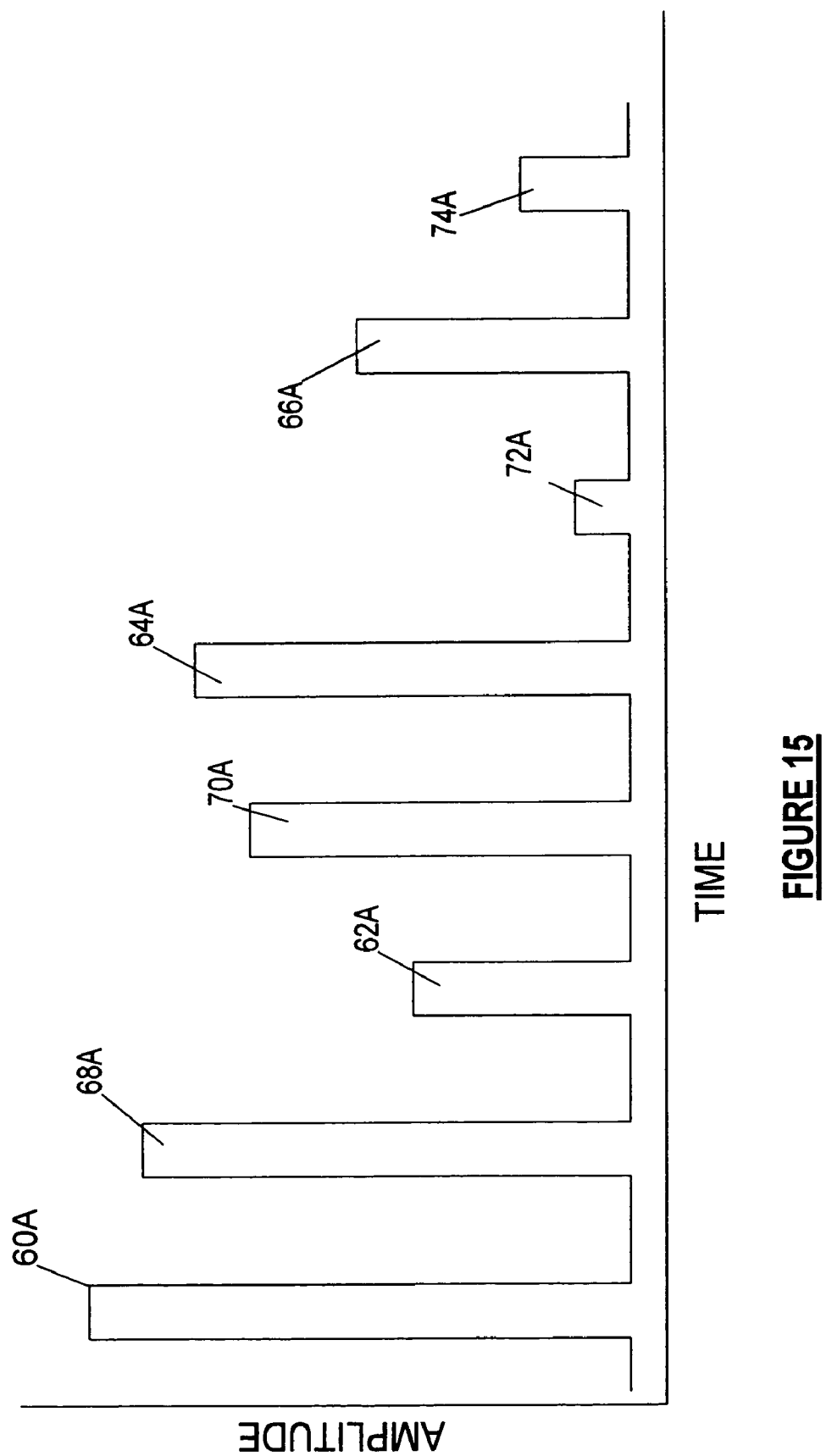
FIG. 15 is a notional graph showing the distribution of pulses in the apparatus according to FIG. 14 when the delay line between the transducer and the broad band mirror has half the delay of a delay line preceding a narrow band mirror.

Attention is drawn to FIG. 14, showing a schematic diagram of another embodiment incorporating the present invention. FIG. 14 is very similar to FIG. 10 and like reference numerals apply to like items. The difference between FIG. 10 and FIG. 14 is that the second broad band mirror 58 has been moved from the first coupler 18 to become an in line partially reflecting broad band mirror 58, which could be located down hole and separated from the sensor 22 by a down hole delay line 98. Thus, the first pulse 60 shown in FIG. 11 is shifted to emerge from the fibre optic line 20 at a time in advance of the fourth second embodiment pulse determined by the delay of the down hole delay line 98. FIG. 15 is a stylised chart of the pulse arrival time which would be experienced if the down hole delay line provides a delay which is half the length of the delay imparted by each section of delay line 32A, 32B, 32C preceding each narrow band mirror 34. The pulses have been numbered using similar numbers to those shown in FIG. 11, similar numbers indicating reflected light pulses from similar origins. The use of the half delay period down hole delay line 98 permits alternation of the reflective pulses between reference pulses and sensor pulses, the reference and sensor pulses being interleaved. In FIG. 15, it is worthy of note that there is not the long delay experienced between the first third embodiment pulse 60A and the fifth third embodiment pulse 68A.

As an alternative, the down hole delay line 98 can be made four times the length of the delay line 32A, 32B, 32C, so that the reference pulses 60A, 62A, 64A are separate from and precede the sensor pulses 68A, 70A, 72A, 74A.

The broad band reflector 58 is preferably implemented using a down hole coupler 106, similar to the first coupler and the second coupler 18, 26, so that the light goes straight to and straight from the down hole mirror 58 without involving the sensor 22 and thereby eliminating the potential for the light to ring to and from the sensor 22 through the down hole delay line 98 potentially to distort the amplitudes of subsequent pulses. A down hole coupler 106 is shown only on the fibre optic line 20 in FIG. 14, and is not shown at all in FIG. 18 (to be described later) but is, for preference, present on each fibre optic line 20 20' 20" where a broad band reflector 58 58' 58" is employed.

The broad band reflector 58 has a low reflectivity in the region of 4% which is substantially independent of wavelength.

Moving the broad band mirror from the first coupler 18 to its down hole position means that the reference pulse from the light source 10, as measured by the single photo diode 30, is subject to all of the losses and non-uniformity of wavelength response of the entire system (including optical switches) and thereby gives the potential for a more accurate estimation of relative amplitudes. In particular, having the broad band reflector 58 close to the sensor 22, means that coupler and other losses, such as those connected with switch 100, connected with the fibre optic line 20, also register on the reference pulse 60A, which means that compensation exists, allowing operation despite imperfect optical components and compensating for temperature changes and for the well bore environment. In this embodiment, use of pulses 60A, 62A, 64A, and 66A provides for the removal of such losses from pulses 68A, 70A, 72A, and 74A, as previously disclosed in relation to the compensation ratios.

For preference, all of the narrow band reflectors 34A 34B 34C comprise fibre Bragg gratings which feature low insertion loss can easily be designed with well defined spectral characteristics, may be tuned in their central frequency and are commercially readily available.

In the FIG. 14 embodiment using an in-line reflector 58, an optical switch 100 can be added on line 20. A first output of the switch 100 remains connected to the fibre optic line 20, and a second output of the switch 100 is connected to an additional fibre optic line 20', which has an additional reflector 58', an additional down hole delay line 98' and an additional sensor 22'. Thus, this embodiment enables the multiplexing of a plurality of sensors 22, each of which may be individually selected by the switch 100 and each of which may be disposed downhole, the losses of the switch 100 and individual downleads 20 20' being individually compensated for by reflector 58 as previously disclosed.

Figure 16:
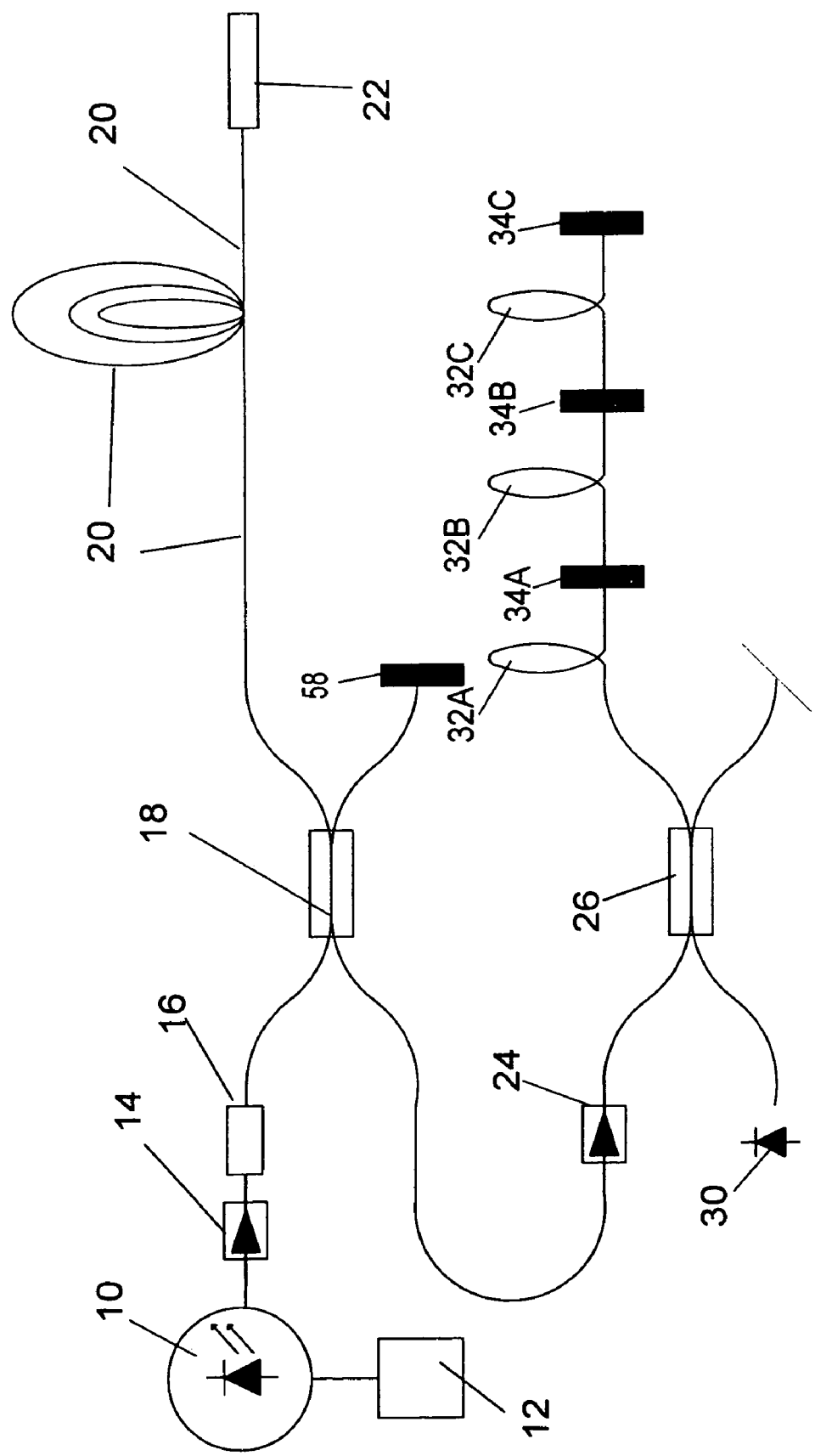
FIG. 16 is a schematic diagram of another embodiment of the present invention, in which only narrowband filters are used downstream of the last coupler.

Attention is drawn to FIG. 16, which is a schematic diagram of another embodiment incorporating the present invention. Everything is as in FIG. 10, with the exception that the first broad band mirror 28 has been omitted. Like numbers mean like items.

Figure 17:
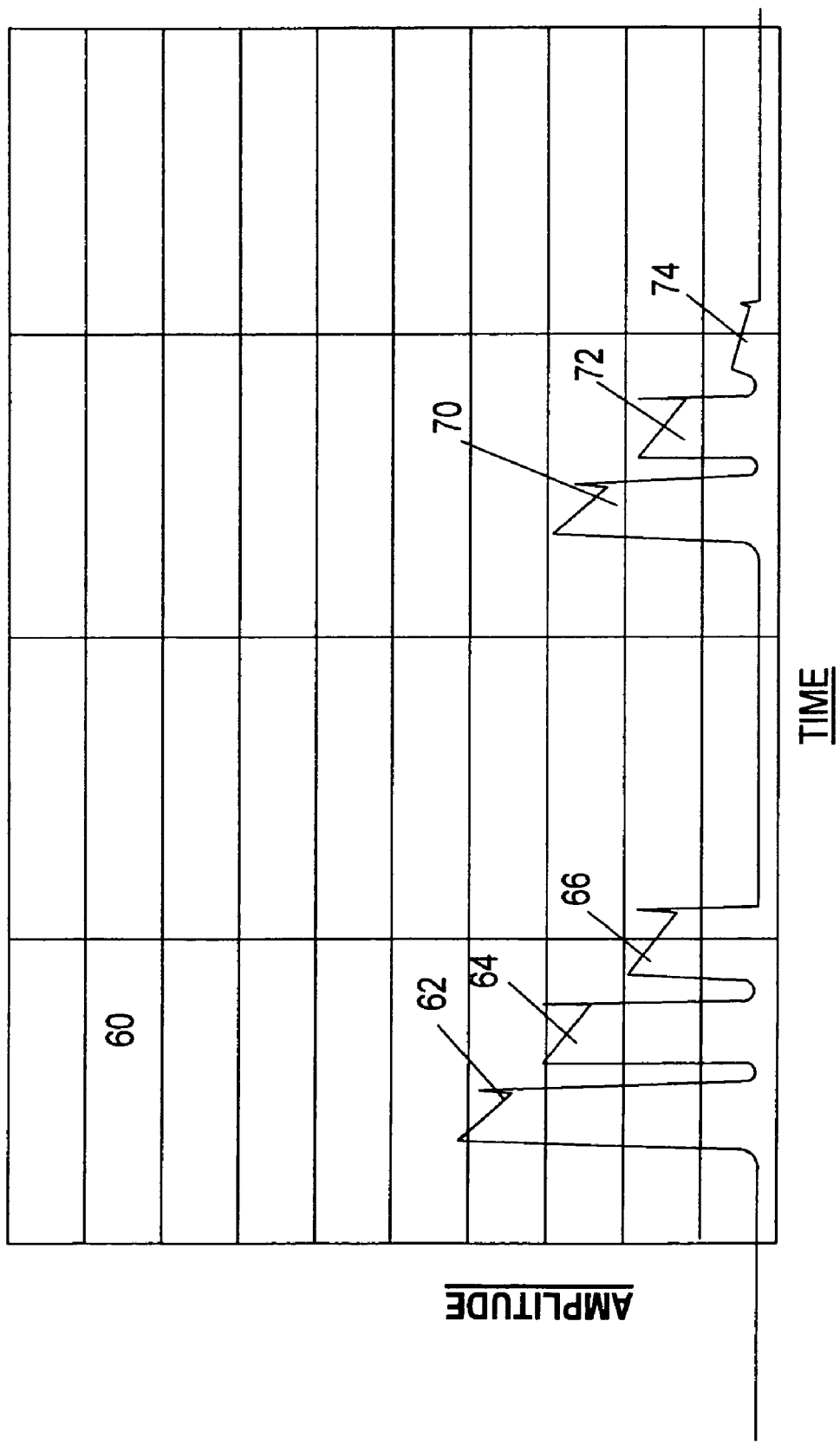
FIG. 17 is a notional graph showing the distribution of pulses in the apparatus according to FIG. 12.

FIG. 17 is the time graph of signals intercepted by the single photo detector 30. This graph is very similar to that shown on FIG. 11, again with like numbers designating like items. The observed pulses 62 64 66 are the result of light pulse reflecting from the broadband mirror 58 and then from each of the narrowband filters 34A 34B 34C. The observed pulses 70 72 74 are the result of light pulse reflecting from the sensor 22 and then from each of the narrowband filters 34A 34B 34C.

The pulses 62 64 66 can be used for the removal of losses from pulses 70 72 74, as previously disclosed in relation to the compensation ratios, the overall compensation ratio not being applied The pulses 70 72 74 from the narrow band mirrors 34A 34B 34C can be provided, via a high speed analog to digital convertor 54 to the microprocessor 56 (as shown in FIG. 5) which calculates the relative amplitudes of the narrow band pulses 70 72 74 to calculate the stimulus acting on the sensor 22, as previously disclosed.

Attention is next drawn to FIG. 18, showing a further embodiment of the present invention, similar to that shown in FIG. 10, where like numbers designate like items. In FIG. 14, the second output of the switch 100 connects to an additional coupler 18' which simultaneously drives the additional fibre optic line 20' and a further fibre optic line 20" which connects to a further broad band reflector 58", a further downhole delay line 98" and a further sensor 22". The lengths of the additional fibre optic line 22' and of the further fibre optic line 22" are different (in this instance the further fibre optic line 22" is shorter).

FIG. 19 shows how this difference in length causes the single photo detector 30 to experience a first group of pulses 110 (similar to those shown in FIG. 15) from the further fibre optic line 20" and a second group of pulses 112 (also similar to those shown in FIG. 11) temporally separated by the difference in the overall delay and thus separately measurable, allowing pressures or other parameters to be separately measured at different points down the bore hole of a hydrocarbon well. As many different delays as can be separately read can be incorporated in one outlet of the switch 100, couplers 18' providing the separation of routes. Once again, because the broad band reflector 58' 58" is, in each case, proximate to the sensor 22' 22", down the well bore, compensation for device and path losses can be achieved for each fibre optic line 20 20' 20".

The present invention may be incorporated with and in the same system as the inventions described in the following patent applications, each of which is commonly owned and is being filed on even date herewith: "System and Method for Packaging a Fiber Optic Sensor" naming John McLellan, Maxwell Hadley, and Yuehua Chen as inventors; "Light Source Stabilisation" naming James McInnes, Maxwell Hadley, Arthur Hartog, Yuehua Chen, and Timothy Jeffreys as inventors; "Improvement to Remote Monitoring" naming Maxwell Hadley, Arthur Hartog, Yuehua Chen, and James McInnes as inventors; and "Interchangeable Equipment" naming Maxwell Hadley as inventor. Each of such applications are incorporated herein by reference.

What is claimed is:

1. A measurement apparatus for an interferometric optical transducer having two light beam return paths, said apparatus employing a plurality of narrow band light beams; each of said plurality of narrow band light beams being on its own, respective, separated wavelength; each of said plurality of narrow band light beams being amplitude modulated by interference between the two light beam return paths of the transducer; and each of said plurality of narrow band light beams being filtered from a broad band beam returned from the transducer, the broad band light beam being substantially unmodulated by interference in the transducer.

2. An apparatus, according to claim 1, wherein said plurality of narrow band light beams produce a corresponding plurality of substantially sinusoidal amplitude responses with changing path length difference between the two return paths in the transducer, wherein said plurality of substantially sinusoidal responses display phase differences between one another.

3. An apparatus, according to claim 2, including signal processing means, employing said phase differences to extend the range over which the transducer supplies a reliable output.

4. An apparatus, according to claim 3, wherein said signal processing means tracks the angular position along each of the plurality of substantially sinusoidal amplitude responses as the stimulus to the transducer changes.

5. An apparatus, according to claim 4, wherein said signal processing means normalises each of said plurality of substantially sinusoidal responses to a standard amplitude, each value of stimulus having its own unique set of angular values according to the standard amplitude; and wherein said signal processing means employs the measured angular values, according to the standard amplitude, to determine the value of the stimulus.

6. An apparatus, according to claim 1, wherein said plurality of narrow band beams comprises at least three narrowband beams with approximately a 120 degree phase shift between one other.

7. An apparatus, according to claim 1, wherein said plurality of narrow band beams comprises at least two narrow band beams with approximately 90 degrees phase shift between them.

8. An apparatus, according to claim 1, wherein said transducer is disposed in a hydrocarbon well.

9. An apparatus, according to claim 1, comprising a plurality of fibre optic lines, each with a transducer at the distal end thereof and each of said plurality of fibre optic lines providing a different delay, said apparatus comprising a coupler, to couple said repetitive pulse of broad band light to each of said plurality of fibre optic lines together, and further to couple reflected pulses, to said single photo detector, received from the distal ends of each of said plurality of fibre optic lines, at different times.

10. An apparatus, according to claim 9, wherein each of said plurality of transducers comprises a broad band reflector proximate thereto.

11. An apparatus for processing signals from a remote interferometric transducer at the distal end of a fibre optic line, said apparatus comprising:
    means for supplying a broad band light beam;
    a beam splitter;
    a coupler for coupling said broad band light beam into the fibre optic line to be returned from the interferometric transducer and for coupling the returned beam from said fibre optic line into said beam splitter; wherein said beam splitter splits said returned light beam into at least three sub beams; wherein at least one of said sub beams is broadband; and two of said sub beams are narrow band and on different wavelengths; and
    a receiver for measuring the amplitude of each of said sub beams; where said different wavelengths are such that the amplitude of at least two of said sub beams have a phase difference there-between; and where said apparatus uses the phase difference to sense the path length difference of said remote interferometric transducer.

12. An apparatus, according to claim 11, employing the relative amplitudes of said at least one broad band sub beam and at least one of said narrow band sub beams to sense the path length difference of said remote interferometric transducer.

13. An apparatus, according to claim 11, wherein said at least two narrow band sub beams comprises three narrow band sub beams, and wherein the phase difference between said three narrowband sub-beams is substantially 120 degrees throughout the region of operation of the interferometric transducer.

14. An apparatus, according to claim 11, wherein the phase difference between said two narrowband sub-beams is substantially 90 degrees throughout the region of operation of the interferometric transducer.

15. An apparatus, according to claim 11, comprising signal processing means monitoring the amplitudes of said two or more sub beams and individually employing the amplitudes of said two or more narrow band sub beams to find the path length difference of said remote interferometric transducer.

16. An apparatus, according to claim 11, comprising a polarization scrambler to compensate for birefringence in the fibre optic cable.

17. An apparatus, according to claim 11, comprising a single photo detector, in combination with a shutter and beam combiner, to sample some or all of the sub beams.

18. An apparatus, according to claim 11, wherein said interferometric transducer is deployed within a hydrocarbon well.

19. An apparatus for processing signals from a remote optical transducer at the distal end of a fibre optic line, said apparatus comprising:
    means for supplying a broad band light beam;
    modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;
    a broad band reflector to cause each pulse from said broad band light source to produce a plurality of individually detectable reflected pulses;
    a single photo detector to respond to individual reflected pulses of light;
    pulse identification means to identify to which of said plurality of reflected pulses said single photo detector is responding at any time; and
    processing means to analyze the amplitude relationship between at least some of said plurality of individually detectable reflected pulse, wherein said processing means compares the amplitudes of a plurality of narrow band pulses reflected from said transducer, each of said narrow band pulses having a different respective wavelength and each filtered from a reflected broad band pulse returned from said transducer, each of said plurality of narrow band pulses being sufficiently narrow for the path length difference in the transducer to cause amplitude modulation of that narrow band pulse.

20. An apparatus, according to claim 19, wherein the repetition delay between successive narrow light pulses is longer than the round trip time for the light pulse to travel to and from the distal end of the fibre optic line, thereby enabling the presence of only a single set of the plurality of reflections from one single light pulse to be in transit at any one time.

21. An apparatus, according to claim 19, wherein said pulse identification means is responsive to the amplitude of at least one of the plurality of individually detectable reflected pulses to identify individual reflected pulses by their order of arrival.

22. An apparatus, according to claim 19, wherein said remote optical transducer is a pressure sensor.

23. An apparatus, according to claim 19, wherein said remote optical transducer is a temperature sensor.

24. An apparatus, according to claim 19, wherein said remote optical transducer is a flow rate sensor.

25. An apparatus, according to claim 19, wherein said remote optical transducer is a chemical property sensor.

26. An apparatus, according to claim 19, wherein said remote optical transducer is a strain gauge.

27. An apparatus, according to claim 19, wherein said distal end of said fibre optic line is situated in the bore of a hydrocarbon well.

28. An apparatus, according to claim 19, wherein said transducer is located in a hydrocarbon well.

29. An apparatus for processing signals from a remote optical transducer at the distal end of a fibre optic line, said apparatus comprising:
means for supplying a broad band light beam;
modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;
a broad band reflector to cause each pulse from said broad band light source to produce a plurality of individually detectable reflected pulses;
a single photo detector to respond to individual reflected pulses of light;
pulse identification means to identify to which of said plurality of reflected pulses said single photo detector is responding at any time; and
processing means to analyze the amplitude relationship between at least some of said plurality of individually detectable reflected pulses,
wherein the repetition delay between successive narrow light pulses is shorter than the round trip time for the light pulse to travel to and from the distal end of the fibre optic line, thereby enabling the presence of plural sets of the plurality of reflections from one single light pulse to be in transit at any one time.

30. An apparatus, according to claim 29, wherein a plurality of sets of reflections from multiple light pulses are interleaved at the single photo detector.

31. An apparatus for processing signals from a remote optical transducer at the distal end of a fibre optic line, said apparatus comprising:
means for supplying a broad band light beam;
modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;
a broad band reflector to cause each pulse from said broad band light source to produce a plurality of individually detectable reflected pulses;
a single photo detector to respond to individual reflected pulses of light;
pulse identification means to identify to which of said plurality of reflected pulses said single photo detector is responding at any time; and
processing means to analyze the amplitude relationship between at least some of said plurality of individually detectable reflected pulses, wherein said processing means averages the amplitude of each individual reflected pulse in a set over at least two pulse repetition periods.

32. An apparatus for processing signals from a remote optical transducer at the distal end of a fibre optic line, said apparatus comprising:
means for supplying a broad band light beam;
modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;
a broad band reflector to cause each pulse from said broad band light source to produce a plurality of individually detectable reflected pulses;
a single photo detector responds to individual reflected pulses of light;
pulse identification means to identify to which of said plurality of reflected pulses said single photo detector is responding at any time; and
processing means to analyze the amplitude relationship between at least some of said plurality of individually detectable reflected pulses,
wherein said pulse identification means is responsive to the known light source pulse times and the unchanging delays caused by the fibre optic line lengths.

33. An apparatus, according to claim 32, wherein said unchanging delays are measured for use.

34. An apparatus for processing signals from a remote optical transducer at the distal end of a fibre optic line, said apparatus comprising:
means for supplying a broad band light beam;
modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;
a broad band reflector to cause each pulse from said broad band light source to produce a plurality of individually detectable reflected pulses;
a single photo detector responds to individual reflected pulses of light;
pulse identification means to identify to which of said plurality of reflected pulses said single photo detector is responding at any time; and
processing means to analyze the amplitude relationship between at least some of said plurality of individually detectable reflected pulses, wherein said processing means compares the amplitude of a returned broad band pulse from said transducer with the amplitude of a narrow band pulse filtered from said returned broad band pulse from said transducer, the narrow band pulse being sufficiently narrow for the path length difference in the transducer to cause amplitude modulation of the narrow band pulse, and said processing means employing the comparison to provide indication of the value of the parameter measured by the transducer.

35. An apparatus, according to claim 34, wherein said filtered narrow band pulse is derived by reflecting the reflected broad band pulse from the transducer from a narrow band reflector at the distal end of a fibre optic delay line.

36. An apparatus for processing signals from a remote optical transducer at the distal end of a fibre optic line, said apparatus comprising:
means for supplying a broad band light beam;
modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;

a broad band reflector to cause each pulse from said broad band light source to produce a plurality of individually detectable reflected pulses;

a single photo detector responding to individual reflected pulses of light;

pulse identification means to identify to which of said plurality of reflected pulses said single photo detector is responding at any time; and processing means to analyze the amplitude relationship between at least some of said plurality of individually detectable reflected pulses, wherein said processing means compares the amplitude of a reflected broad band pulse from said transducer with the amplitudes of a plurality of narrow band pulses, each having a different respective wavelength and each filtered from said reflected broad band pulse returned from said transducer, each narrow band pulse being sufficiently narrow for the path length difference in the transducer to cause amplitude modulation of that narrow band pulse.

37. An apparatus, according to claim 36, wherein said plurality of narrow band pulses each produce a substantially sinusoidal graph of amplitude versus path length difference in the transducer, at least two of the graphs having a perceptible phase difference.

38. An apparatus, according to claim 37, wherein said phase difference is substantially 120 degrees around the region of operation of the sensor.

39. An apparatus, according to claim 37, wherein said phase difference is substantially 90 degrees around the region of operation of the sensor.

40. An apparatus, according to claim 36, wherein said plurality of reflected narrow band pulses are provided by a plurality of narrow band reflectors deployed along a fibre optic line, between successive delay lines, to reflect a corresponding plurality of different samples of the reflected broad band pulse, received from the transducer, towards the single photo detector.

41. An apparatus for processing signals from a remote optical transducer at the distal end of a fibre optic line, said apparatus comprising:

means for supplying a broad band light beam;

modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;

a broad band reflector to cause each pulse from said broad band light source to produce a plurality of individually detectable reflected pulses, wherein the plurality of reflected pulses include a plurality of reflected narrow band pulses and a reflected broad band pulse;

a single photo detector to respond to individual reflected pulses of light;

pulse identification means to identify to which of said plurality of reflected pulses said single photo detector is responding at any time; and processing means to analyze the amplitude relationship between at least some of said plurality of individually detectable reflected pulses, wherein said processing means compares at least three amplitudes of the plural amplitudes of the plurality of reflected narrow band pulses with the amplitude of the reflected broad band pulse, and employs the measured amplitude and phase difference to provide indication of the value of the parameter measured by the transducer.

42. An apparatus for processing signals from a remote optical transducer at the distal end of a fibre optic line, said apparatus comprising:

means for supplying a broad band light beam;

modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;

a broad band reflector to cause each pulse from said broad band light source to produce a plurality of individually detectable reflected pulses, wherein the plurality of reflected pulses include a plurality of reflected narrow band pulses and a reflected broad band pulse;

a single photo detector to respond to individual reflected pulses of light;

pulse identification means to identify to which of said plurality of reflected pulses said single photo detector is responding at any time; and processing means to analyze the amplitude relationship between at least some of said plurality of individually detectable reflected pulses; wherein said processing means compares the amplitudes of the plurality of narrow band pulses reflected from said transducer, each of said narrow band pulses having a different respective wavelength and each filtered from the reflected broad band pulse returned from said transducer, each of said plurality of narrow band pulses being sufficiently narrow for the path length difference in the transducer to cause amplitude modulation of that narrow band pulse, wherein said plurality of narrow band pulses each produce a substantially sinusoidal graph of amplitude versus path length difference in the transducer, at least two of the graphs having a perceptible phase difference.

43. An apparatus, according to claim 42, wherein said phase difference is substantially 120 degrees around the region of operation of the sensor.

44. An apparatus, according to claim 42, wherein said phase difference is substantially 90 degrees around the region of operation of the sensor.

45. An apparatus for processing signals from a remote optical transducer at the distal end of a fibre optic line, said apparatus comprising:

means for supplying a broad band light beam;

modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;

a broad band reflector to cause each pulse from said broad band light source to produce a plurality of individually detectable reflected pulses, wherein the plurality of reflected pulses include a plurality of reflected narrow band pulses and a reflected broad band pulse;

a single photo detector to respond to individual reflected pulses of light;

pulse identification means to identify to which of said plurality of reflected pulses said single photo detector is responding at any time; and processing means to analyze the amplitude relationship between at least some of said plurality of individually detectable reflected pulses; wherein said processing means employs the comparison between a plurality of amplitudes of the plurality of reflected narrow band pulses, and employs the measured amplitudes thereof and the phase differences there-between to provide indication of the value of the parameter measured by the transducer.

46. An apparatus for processing signals from a remote optical transducer at the distal end of a fibre optic line, said apparatus comprising:
means for supplying a broad band light beam;
modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;
a broad band reflector to cause each pulse from said broad band light source to produce a plurality of individually detectable reflected pulses;
a single photo detector to respond to individual reflected pulses of light;
pulse identification means to identify to which of said plurality of reflected pulses said single photo detector is responding at any time;
processing means to analyze the amplitude relationship between at least some of said plurality of individually detectable reflected pulses; and
a broad band mirror, disposed proximately, on the fibre optic line, to said transducer, said broad band mirror returing a reference pulse to said single photo detector, said reference pulse being subject to substantially the same losses and spectral and polarization imbalances as the reflected broad band pulse from the transducer.

47. An apparatus, according to claim 46, wherein said broad band mirror is in line with the transducer.

48. An apparatus, according to claim 46, wherein broad band mirror is located close to said transducer and is separated from said transducer by a transducer delay line.

49. An apparatus, according to claim 48, wherein said transducer delay line has a delay which is half the delay of a delay line preceding a narrow band reflector, whereby reference and sensor pulses interleave.

50. An apparatus, according to claim 48, wherein said transducer delay line has a delay which is "n" times or more the delay of a delay line preceding a narrow band reflector, where "n" equals the number of narrow band pulses plus the number of broadband pulses, whereby the reference and transducer pulses form separate sequences.

51. An apparatus, according to claim 46, wherein broad band mirror is located close to said transducer and is separated from said transducer by a coupler.

52. An apparatus, according to claim 46, wherein the amplitude of the reflected reference pulse is measured and used as a basis for comparison with the measured amplitude of one or more narrow band pulses to determine the value of the parameter measured by the transducer.

53. An apparatus for processing signals from a remote optical transducer at the distal end of a fibre optic line, said apparatus comprising:
means for supplying a broad band light beam;
modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;
a broad band reflector to cause each pulse from said broad band light source to produce a plurality of individually detectable reflected pulses;
a single photo detector to respond to individual reflected pulses of light;
pulse identification means to identify to which of said plurality of reflected pulses said single photo detector is responding at any time;
processing means to analyze the amplitude relationship between at least some of said plurality of individually detectable reflected pulses;
a plurality of fibre optic lines, each with a transducer at the distal end thereof; and
an optical switch to select which of said plurality of fibre optic lines is to receive said repetitive pulse of broad band light.

54. An apparatus, according to claim 53, wherein each of said plurality of transducers comprises a broad band reflector proximate thereto.

55. An apparatus for processing signals from a remote optical transducer at the distal end of a fibre optic line, said apparatus comprising:
means for supplying a broad band light beam;
modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;
a broad band reflector to cause each pulse from said broad band light source to produce a plurality of individually detectable reflected pulses;
a single photo detector to respond to individual reflected pulses of light;
pulse identification means to identify to which of said plurality of reflected pulses said single photo detector is responding at any time; and
processing means to analyze the amplitude relationship between at least some of said plurality of individually detectable reflected pulses,
wherein said transducer is located in a hydrocarbon well, and
wherein said broad band reflector is down the hydrocarbon well.

56. An apparatus for processing signals from a remote optical transducer at the distal end of a fibre optic line, said apparatus comprising:
means for supplying a broad band light beam;
modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;
a broad band reflector to cause each pulse from said broad band light source to produce a plurality of individually detectable reflected pulses;
a single photo detector to respond to individual reflected pulses of light;
pulse identification means to identify to which of said plurality of reflected pulses said single photo detector is responding at any time; and processing means to analyze the amplitude relationship between at least some of said plurality of individually detectable reflected pulses, wherein said transducer is located in a hydrocarbon well, and wherein said broad band reflector is at the wellhead of the hydrocarbon well.

57. An apparatus for processing signals from a remote optical transducer at the distal end of a fibre optic line, said apparatus comprising:

means for supplying a broad band light beam;

modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;

a broad band reflector to cause each pulse from said broad band light source to produce a plurality of individually detectable reflected pulses;

a single photo detector to respond to individual reflected pulses of light;

pulse identification means to identify to which of said plurality of reflected pulses said single photo detector is responding at any time;

processing means to analyze the amplitude relationship between at least some of said plurality of individually detectable reflected pulses; and a polarization scrambler, to eliminate the effects of birefringence and polarization-dependent losses in the fibre optic line and associated optical components.

58. An apparatus for processing signals from a remote optical transducer at the distal end of a fibre optic line, said apparatus comprising:

means for supplying a broad band light beam;

modulation means for causing said broad band light beam to be modulated in intensity to produce a repetitive narrow pulse of broad band light, said repetitive narrow light pulses having a repetition delay therebetween, said pulse having a width which is an insignificant fraction of the round trip time to and from the distal end of the fibre optic line;

a broad band reflector to cause each pulse from said broad band light source to produce a plurality of individually detectable reflected pulses, wherein said plurality of reflected pulses include a first and second reflected narrow band pulse and a first and second reflected broad band pulse;

a single photo detector to respond to individual reflected pulses of light;

pulse identification means to identify to which of said plurality of reflected pulses said single photo detector is responding at any time;

processing means to analyze the amplitude relationship between at least some of said plurality of individually detectable reflected pulses; and compensation means, to compensate for the losses in intensity of the light source and common components of the apparatus by calculating a narrowband compensation ratio and a broadband compensation ratio and taking the ratio of the two, wherein the compensation means calculates the narrow band compensation ratio by dividing the amplitude of the second reflected narrow band pulse by the amplitude of the first reflected narrow band pulse, and calculates the broad band compensation ratio by dividing the amplitude of the second reflected narrow band pulse by the amplitude of the first reflected broad band pulse.

59. A method for processing signals from a remote optical transducer at the distal end of a fibre optic line, said method including the steps of:

supplying a broad band light beam;

modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;

creating, by means of a broad band reflector, a plurality of individually detectable reflected pulses from each broad band light source pulse, wherein the plurality of reflected pulses include a plurality of reflected narrow band pulses and a reflected broad band pulse;

responding to each individual reflected pulse of light using a single photo detector;

identifying to which of said plurality of reflected pulses said single photo detector is responding at any time;

analyzing the amplitude relationship between at least some of said plurality of individually detectable reflected pulses;

comparing the plural amplitudes of the plurality of reflected narrow band pulses; and employing the measured amplitudes of the plural narrow band pulses and the phase differences there-between to provide indication of the value of the parameter measured by the transducer.

60. A method for processing signals from a remote optical transducer at the distal end of a fibre optic line, said method including the steps of:

supplying a broad band light beam;

modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;

creating, by means of a broad band reflector, a plurality of individually detectable reflected pulses from each broad band light source pulse;

responding to each individual reflected pulse of light using a single photo detector;

identifying to which of said plurality of reflected pulses said single photo detector is responding at any time;

analyzing the amplitude relationship between at least some of said plurality of individually detectable reflected pulses; and causing the repetition delay between successive narrow light pulses to be longer than the round trip time for the light pulse to travel to and from the distal end of the fibre optic line, thereby enabling the presence of only a single set of the plurality of reflections from one single light pulse to be in transit at any one time.

61. A method, according to claim 59, wherein said step of identifying to which of said plurality of reflected pulses said single photo detector is responding at any time includes the step of responding to the amplitude of at least one of the plurality of individually detectable reflected pulses and identifying individual reflected pulses by their order of arrival.

62. A method, according to claim 59, wherein said remote optical transducer is a pressure sensor.

63. A method, according to claim 59, wherein said remote optical transducer is a temperature sensor.

64. A method, according to claim 59, wherein said remote optical transducer is a flow rate sensor.

65. A method, according to claim 59, wherein said remote optical transducer is a chemical property sensor.

66. A method, according to claim 59, wherein said remote optical transducer is a strain gauge.

67. A method, according to claim 59, wherein said distal end of said fibre optic line is situated in the bore of a hydrocarbon well.

68. A method, according to claim 59, further including the step of locating said transducer in a hydrocarbon well.

69. A method for processing signals from a remote optical transducer at the distal end of a fibre optic line, said method including the steps of:
  supplying a broad band light beam;
  modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;
  creating, by means of a broad band reflector, a plurality of individually detectable reflected pulses from each broad band light source pulse;
  responding to each individual reflected pulse of light using a single photo detector;
  identifying to which of said plurality of reflected pulses said single photo detector is responding at any time;
  analyzing the amplitude relationship between at least some of said plurality of individually detectable reflected pulses; and
  causing the repetition delay between successive narrow light pulses to be shorter than the round trip time for the light pulse to travel to and from the distal end of the fibre optic line, thereby enabling the presence of plural sets of the plurality of reflections from one single light pulse to be in transit at any one time.

70. A method, according to claim 69, wherein said repetition delay is such that a plurality of sets of reflections from multiple light pulses are interleaved at the single photo detector.

71. A method for processing signals from a remote optical transducer at the distal end of a fibre optic line, said method including the steps of:
  supplying a broad band light beam;
  modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;
  creating, by means of a broad band reflector, a plurality of individually detectable reflected pulses from each broad band light source pulse;
  responding to each individual reflected pulse of light using a single photo detector;
  identifying to which of said plurality of reflected pulses said single photo detector is responding at any time;
  analyzing the amplitude relationship between at least some of said plurality of individually detectable reflected pulses; and
  averaging amplitudes of each individual reflected pulse in a set over at least two pulse repetition periods to employ the averaed amplitudes to provide an indication of parameters measured by the transducer.

72. A method for processing signals from a remote optical transducer at the distal end of a fibre optic line, said method including the steps of:
  supplying a broad band light beam; modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;
  creating, by means of a broad band reflector, a plurality of individually detectable reflected pulses from each broad band light source pulse;
  responding to each individual reflected pulse of light using a single photo detector;
  identifying to which of said plurality of reflected pulses said single photo detector is responding at any time; and
  analyzing the amplitude relationship between at least some of said plurality of individually detectable reflected pulses to employ the analyzed amplitude relationship to provide an indication of parameters measured by the transducer,
  wherein said step of identifying to which of said plurality of reflected pulses said single photo detector is responding at any time includes the step of responding to the known light source pulse times and taking account of the unchanging delays caused by the fibre optic line length.

73. A method, according to claim 72, further including the step of measuring said unchanging delay for use.

74. A method for processing signals from a remote optical transducer at the distal end of a fibre optic line, said method including the steps of:
  supplying a broad band light beam;
  modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;
  creating, by means of a broad band reflector, a plurality of individually detectable reflected pulses from each broad band light source pulse;
  responding to each individual reflected pulse of light using a single photo detector;
  identifying to which of said plurality of reflected pulses said single photo detector is responding at any time; and
  analyzing the amplitude relationship between at least some of said plurality of individually detectable reflected pulses, wherein said step of analyzing the amplitude relationship between at least some of said plurality of individually detectable reflected pulses includes the steps of comparing the amplitude of a returned broad band pulse from said transducer with the amplitude of a narrow band pulse filtered from said returned broad band pulse from said transducer, the narrow band pulse being sufficiently narrow for the path length difference in the transducer to cause amplitude modulation of the narrow band pulse, and employing the comparison to provide indication of the value of the parameter measured by the transducer.

75. A method, according to claim 74, including the step of deriving said filtered narrow band pulse by reflecting the returned broad band pulse from the transducer from a narrow band reflector at the distal end of a fibre optic delay line.

76. A method, according to claim 74, including the step of comparing the amplitudes of a plurality of narrow band pulses reflected from said transducer, each of said narrow band pulses having a different respective wavelength and each filtered from a reflected broad band pulse returned from said transducer, where each of said plurality of narrow band pulses being sufficiently narrow for the path length difference in the transducer to cause amplitude modulation of that narrow band pulse.

77. A method, according to claim 76, wherein said plurality of narrow band pulses each produce a substantially sinusoidal graph of amplitude versus path length difference in the transducer, at least two of the graphs having a perceptible phase difference.

78. A method, according to claim 77, wherein said phase difference is substantially 120 degrees around the region of operation of the sensor.

79. A method, according to claim 77, wherein said phase difference is substantially 90 degrees around the region of operation of the sensor.

80. A method, according to claim 76, further including the step of providing a broad band reflector proximate to each of said plurality of transducers.

81. A method for processing signals from a remote optical transducer at the distal end of a fibre optic line, said method including the steps of:
   supplying a broad band light beam;
   modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;
   creating, by means of a broad band reflector, a plurality of individually detectable reflected pulses from each broad band light source pulse;
   responding to each individual reflected pulse of light using a single photo detector;
   identifying to which of said plurality of reflected pulses said single photo detector is responding at any time; and
   analyzing the amplitude relationship between at least some of said plurality of individually detectable reflected pulses to employ the analyzed amplitude relationship to provide an indication of parameters measured by the transducer, wherein said step of analyzing the amplitude relationship between at least some of said plurality of individually detectable reflected pulses includes the step of comparing the amplitude of a reflected broad band pulse from said transducer with the amplitudes of a plurality of narrow band pulses, each having a different respective wavelength and each filtered from said reflected broad band pulse returned from said transducer, each narrow band pulse being sufficiently narrow for the path length difference in the transducer to cause amplitude modulation of that narrow band pulse.

82. A method, according to claim 81, wherein said plurality of narrow band pulses each produce a substantially sinusoidal graph of amplitude versus path length difference in the transducer, at least two of the graphs having a perceptible phase difference.

83. A method, according to claim 82, wherein said phase difference is substantially 120 degrees around the region of operation of the transducer.

84. A method, according to claim 82, wherein said phase difference is substantially 90 degrees around the region of operation of the transducer.

85. A method, according to claim 81, including the step of providing said plurality of reflected narrow band pulses from a plurality of narrow band reflectors deployed along a fibre optic line, between successive delay lines, to reflect a corresponding plurality of different samples of the reflected broad band pulse, received from the transducer, towards the single photo detector.

86. A method for processing signals from a remote optical transducer at the distal end of a fibre optic line, said method including the steps of:
   supplying a broad band light beam;
   modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;
   creating, by means of a broad band reflector, a plurality of individually detectable reflected pulses from each broad band light source pulse, wherein said plurality of reflected pulses include a plurality of reflected narrow band pulses and a reflected broad band pulse;
   responding to each individual reflected pulse of light using a single photo detector;
   identifying to which of said plurality of reflected pulses said single photo detector is responding at any time; and
   analyzing the amplitude relationship between at least some of said plurality of individually detectable reflected pulses, wherein said step of analyzing the amplitude relationship between at least some of said plurality of individually detectable reflected pulses includes the steps of comparing at least three amplitudes of the plural amplitudes of the plurality of reflected narrow band pulses with the amplitude of the reflected broad band pulse, and employing the measured amplitude and phase difference to provide an indication of the value of the parameter measured by the transducer.

87. A method for processing signals from a remote optical transducer at the distal end of a fibre optic line, said method including the steps of:
   supplying a broad band light beam;
   modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;
   creating, by means of a broad band reflector, a plurality of individually detectable reflected pulses from each broad band light source pulse;
   responding to each individual reflected pulse of light using a single photo detector;
   identifying to which of said plurality of reflected pulses said single photo detector is responding at any time;
   analyzing the amplitude relationship between at least some of said plurality of individually detectable reflected pulses; and
   providing a broad band mirror, disposed proximately, on the fibre optic line, to said transducer, for said broad band mirror to return a reference pulse to said single photo detector, said reference pulse being subject to substantially the same losses and spectral and polarization imbalances as the reflected broad band pulse from the transducer.

88. A method, according to claim 87, further including the step of providing said broad band mirror in line with the transducer.

89. A method, according to claim 87, further including the step of providing said broad band mirror close to said transducer and separating said broad band mirror from said transducer by a transducer delay line.

90. A method, according to claim 89, further including the step of providing said transducer delay line with a delay which is half the delay of a delay line preceding a narrow band reflector, whereby reference and sensor pulses interleave.

91. A method, according to claim 89, further including the step of providing said transducer delay line with a delay which is "n" times or more the delay of a delay line preceding a narrow band reflector, where "n" equals the number of narrow band pulses plus the number of broadband pulses, whereby the reference and transducer pulses form separate sequences.

92. A method, according to claim 87, further including the step of providing said broad band mirror close to said transducer and separating said broad band mirror from said transducer by a coupler.

93. A method for processing signals from a remote optical transducer at the distal end of a fibre optic line, said method including the steps of:
supplying a broad band light beam;
modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;
creating, by means of a broad band reflector, a plurality of individually detectable reflected pulses from each broad band light source pulse;
responding to each individual reflected pulse of light using a single photo detector;
identifying to which of said plurality of reflected pulses said single photo detector is responding at any time; and
analyzing the amplitude relationship between at least some of said plurality of individually detectable reflected pulses; the method for use with a plurality of fibre optic lines, each of said plurality of fibre optic lines having a transducer at the distal end thereof, said method further including the steps of providing an optical switch and employing said optical switch to select which of said plurality of fibre optic lines is to receive said repetitive pulse of broad band light.

94. A method for processing signals from a remote optical transducer at the distal end of a fibre optic line, said method including the steps of:
supplying a broad band light beam;
modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;
creating, by means of a broad band reflector, a plurality of individually detectable reflected pulses from each broad band light source pulse;
responding to each individual reflected pulse of light using a single photo detector;
identifying to which of said plurality of reflected pulses said single photo detector is responding at any time; and
analyzing the amplitude relationship between at least some of said plurality of individually detectable reflected pulses; the method for use with a plurality of fibre optic lines, each of said plurality of fibre optic lines having a transducer at the distal end thereof and each of said plurality of fibre optic lines providing a different delay, said method further including the step of providing a coupler to couple said repetitive pulse of broad band light to each of said plurality of fibre optic lines together, and to couple reflected pulses, to said single photo detector, received from the distal ends of each of said plurality of fibre optic lines, at different times.

95. A method, according to claim 94, further including the step of providing a broad band reflector proximate to each of said plurality of transducers.

96. A method for processing signals from a remote optical transducer at the distal end of a fibre optic line, said method including the steps of:
supplying a broad band light beam;
modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;
creating, by means of a broad band reflector, a plurality of individually detectable reflected pulses from each broad band light source pulse, wherein said plurality of reflected pulses include one or more reflected narrow band pulses;
responding to each individual reflected pulse of light using a single photo detector;
identifying to which of said plurality of reflected pulses said single photo detector is responding at any time; and
analyzing the amplitude relationship between at least some of said plurality of individually detectable reflected pulses to employ the analyzed amplitude relationship to provide an indication of parameters measured by the transducer,
wherein said step of analyzing the amplitude relationship between at least some of said plurality of individually detectable reflected pulses includes the steps of measuring an amplitude of the reflected reference pulse and comparing the amplitude of the reflected reference pulse with measured amplitudes of the one or more reflected narrow band pulses to determine a value of the parameter measured by the transducer.

97. A method for processing signals from a remote optical transducer at the distal end of a fibre optic line, said method including the steps of:
supplying a broad band light beam;
modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;

creating, by means of a broad band reflector, a plurality of individually detectable reflected pulses from each broad band light source pulse;
responding to each individual reflected pulse of light using a single photo detector;
identifying to which of said plurality of reflected pulses said single photo detector is responding at any time;
analyzing the amplitude relationship between at least some of said plurality of individually detectable reflected pulses;
locating said transducer in a hydrocarbon well; and
locating said broad band reflector down the hydrocarbon well.

98. A method for processing signals from a remote optical transducer at the distal end of a fibre optic line, said method including the steps of:
supplying a broad band light beam;
modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;
creating, by means of a broad band reflector, a plurality of individually detectable reflected pulses from each broad band light source pulse;
responding to each individual reflected pulse of light using a single photo detector;
identifying to which of said plurality of reflected pulses said single photo detector is responding at any time;
analyzing the amplitude relationship between at least some of said plurality of individually detectable reflected pulses;
locating said transducer in a hydrocarbon well; and
providing said broad band reflector at the wellhead of the hydrocarbon well.

99. A method for processing signals from a remote optical transducer at the distal end of a fibre optic line, said method including the steps of:
supplying a broad band light beam;
modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;
creating, by means of a broad band reflector, a plurality of individually detectable reflected pulses from each broad band light source pulse;
responding to each individual reflected pulse of light using a single photo detector;
identifying to which of said plurality of reflected pulses said single photo detector is responding at any time;
analyzing the amplitude relationship between at least some of said plurality of individually detectable reflected pulses; and
providing a polarization scrambler to eliminate the effects of birefringence and polarization-dependent losses in the fibre optic cable and associated optical components.

100. A method for processing signals from a remote optical transducer at the distal end of a fibre optic line, said method including the steps of:
supplying a broad band light beam;
modulating the broad band light beam in intensity to produce a repetitive narrow pulse of broad band light, said repetitive narrow light pulses having a repetition delay therebetween, said pulse having a width which is an insignificant fraction of the round trip time to and from the distal end of the fibre optic line;
creating, by means of a broad band reflector, a plurality of individually detectable reflected pulses from each broad band light source pulse;
responding to each individual reflected pulse of light using a single photo detector;
identifying to which of said plurality of reflected pulses said single photo detector is responding at any time;
analyzing the amplitude relationship between at least some of said plurality of individually detectable reflected pulses; and
compensating for the losses in intensity of the light source and common components of the system by calculating a narrow band compensation ratio and a broadband compensation ratio and taking the ratio of the two to employ compensated values to provide an indication of parameters measured by the transducer.

101. A method for measurement using an interferometric optical transducer having two light beam return paths, said method including the steps of: employing a plurality of narrow band light beams; arranging that each of said plurality of narrow band light beams is on its own, respective, separated wavelength, and each of said plurality of narrow band light beams being amplitude modulated by interference between the two light beam return paths of the transducer; and filtering each of said plurality of narrow band light beams from a broad band beam returned from the transducer, the broad band light beam being substantially unmodulated by interference in the transducer.

102. A method, according to claim 101, for use where said plurality of narrow band light beams produce a corresponding plurality of substantially sinusoidal amplitude responses with changing path length difference between the two return paths in the transducer, and where said plurality of substantially sinusoidal responses display phase differences between one another.

103. A method, according to claim 102, including the step of employing said phase differences to extend the range over which the transducer can supply a reliable output.

104. A method, according to claim 102, further including the step of tracking angular positions along each of the plurality of substantially sinusoidal amplitude responses as stimuli to sensor change.

105. A method, according to claim 104, further including the steps of normalizing each of said plurality of substantially sinusoidal responses to a standard amplitude, each value of the stimuli having its own unique set of angular values according to the standard amplitude; and employing the measured angular values, according to the standard amplitude, to determine values of the stimuli.

106. A method, according to claim 101, wherein said plurality of narrow band beams comprises at least three narrowband beams with approximately a 120 degree phase shift between one other.

107. A method, according to claim 101, wherein said plurality of narrow band beams comprises at least two narrow band beams with approximately 90 degrees phase shift between them.

108. A method, according to claim 101, Further including the step of disposing said transducer in a hydrocarbon well.

109. A method for processing signals from a remote interferometric transducer at the distal end of a fibre optic line, said method including the steps of:

supplying a broad band light beam;

providing a beam splitter;

coupling said broad band light beam into the fibre optic line to be returned from the interferometric transducer;

coupling the returned beam from said fibre optic line into said beam splitter;

employing said beam splitter to split said returned light beam into at least three sub beams, at least one of said sub beams being broadband and at least two of said sub beams being narrow band and on different wavelengths;

measuring the amplitude of each of said sub beams, said different wavelengths are such that the amplitude of at least two of said at least two of said sub beams have a phase difference therebetween; and employing the phase difference to provide an indication of the path length difference of said remote interferometric transducer.

110. A method, according to claim 109, including the step of employing the relative amplitudes of said at least one broad band sub beam and at least one of said narrow band sub beams to provide an indication of the path length difference of said remote interferometric transducer.

111. A method, according to claim 109, for use where said at least two narrow band sub beams comprise three narrow band sub beams, and wherein the phase difference between said three narrowband sub-beams is substantially 120 degrees throughout the region of operation of the interferometric transducer.

112. A method, according to claim 109, for use where the phase difference between said two narrowband sub-beams is substantially 90 degrees throughout the region of operation of the interferometric transducer.

113. A method, according to claim 109, further including the steps of monitoring the amplitudes of said at least two or more narrow band sub beams, and individually employing the amplitudes of said at least two or more narrow band sub beams to find the path length difference of said remote interferometric transducer.

114. A method, according to claim 109, including the step of employing a polarization scrambler to compensate for birefringence in the fibre optic cable.

115. A method, according to claim 109, including the step of employing a single photo detector, in combination with a shutter and beam combiner, to sample some or all of the sub beams.

116. A method, according to claim 109, including the step of deploying said interferometric transducer in a hydrocarbon well.

* * * * *